(12) United States Patent
Yamasaki et al.

(10) Patent No.: US 8,376,094 B2
(45) Date of Patent: Feb. 19, 2013

(54) ELECTROMECHANICAL LINEAR-MOTION ACTUATOR AND ELECTROMECHANICAL BRAKE SYSTEM

(75) Inventors: Tatsuya Yamasaki, Iwata (JP); Masaaki Eguchi, Iwata (JP)

(73) Assignee: NTN Corporation, Osaka (JP)

( * ) Notice: Subject to any disclaimer, the term of this patent is extended or adjusted under 35 U.S.C. 154(b) by 547 days.

(21) Appl. No.: 12/597,041

(22) PCT Filed: May 14, 2008

(86) PCT No.: PCT/JP2008/058824
§ 371 (c)(1),
(2), (4) Date: Oct. 22, 2009

(87) PCT Pub. No.: WO2008/140097
PCT Pub. Date: Nov. 20, 2008

(65) Prior Publication Data
US 2010/0084230 A1    Apr. 8, 2010

(30) Foreign Application Priority Data

May 15, 2007  (JP) .................................. 2007-129327
May 13, 2008  (JP) .................................. 2008-125883

(51) Int. Cl.
    *F16D 55/08*    (2006.01)
(52) U.S. Cl. ...... 188/72.8; 188/72.1; 188/162; 475/154; 74/424.92
(58) Field of Classification Search .................. 188/72.8, 188/72.1, 72.3, 72.7, 158, 162; 475/149, 475/150, 154, 156; 74/424.71, 424.92
See application file for complete search history.

(56) References Cited

U.S. PATENT DOCUMENTS

| | | | | |
|---|---|---|---|---|
| 4,804,073 A | * | 2/1989 | Taig et al. .................... | 188/72.1 |
| 4,836,338 A | * | 6/1989 | Taig ............................. | 188/72.1 |

(Continued)

FOREIGN PATENT DOCUMENTS

| | | |
|---|---|---|
| JP | 7-35847 | 7/1995 |
| JP | 2003-097562 | 4/2003 |

(Continued)

OTHER PUBLICATIONS

International Search Report issued Jun. 17, 2008 in International (PCT) Application No. PCT/JP2008/058824.

(Continued)

*Primary Examiner* — Pamela Rodriguez
(74) *Attorney, Agent, or Firm* — Wenderoth, Lind & Ponack, L.L.P.

(57) ABSTRACT

An electromechanical linear-motion actuator includes a rotary shaft, a stationary outer race member, and planetary rollers between the rotary shaft and the outer race member to rotate about their own axes and revolve around the rotary shaft axis. A helical rib is on the radially inner surface of the outer race member or the radially outer surface of the rotary shaft. A helical groove or circumferential grooves are formed in a radially outer surface of each of the planetary rollers in which the helical rib is engaged. A planetary carrier axially faces the planetary rollers, and thrust ball bearings are between the planetary carrier and the respective planetary rollers 16 for preventing rotation of the respective planetary rollers 16 from being transmitted to the planetary carrier 17. Each of the thrust ball bearings comprises a raceway formed on an axial end surface of the corresponding planetary roller.

26 Claims, 25 Drawing Sheets

U.S. PATENT DOCUMENTS

| | | | |
|---|---|---|---|
| 4,850,457 A * | 7/1989 | Taig | 188/72.1 |
| 5,575,733 A | 11/1996 | Machida et al. | |
| 6,843,605 B2 | 1/2005 | Tamada et al. | |
| 8,109,370 B2 * | 2/2012 | Yamasaki | 188/72.1 |
| 2003/0063829 A1 | 4/2003 | Tamada et al. | |
| 2009/0095579 A1 | 4/2009 | Yamasaki | |

FOREIGN PATENT DOCUMENTS

| | | |
|---|---|---|
| JP | 2007-037305 | 2/2007 |

OTHER PUBLICATIONS

English translation of International Preliminary Report on Patentability and Written Opinion of the International Searching Authority, issued Nov. 24, 2009, in International (PCT) Application No. PCT/JP2008/058824.

English translation of JP 2003-097562, Apr. 2003.

English translation of JP 2007-037305, Feb. 2007.

\* cited by examiner

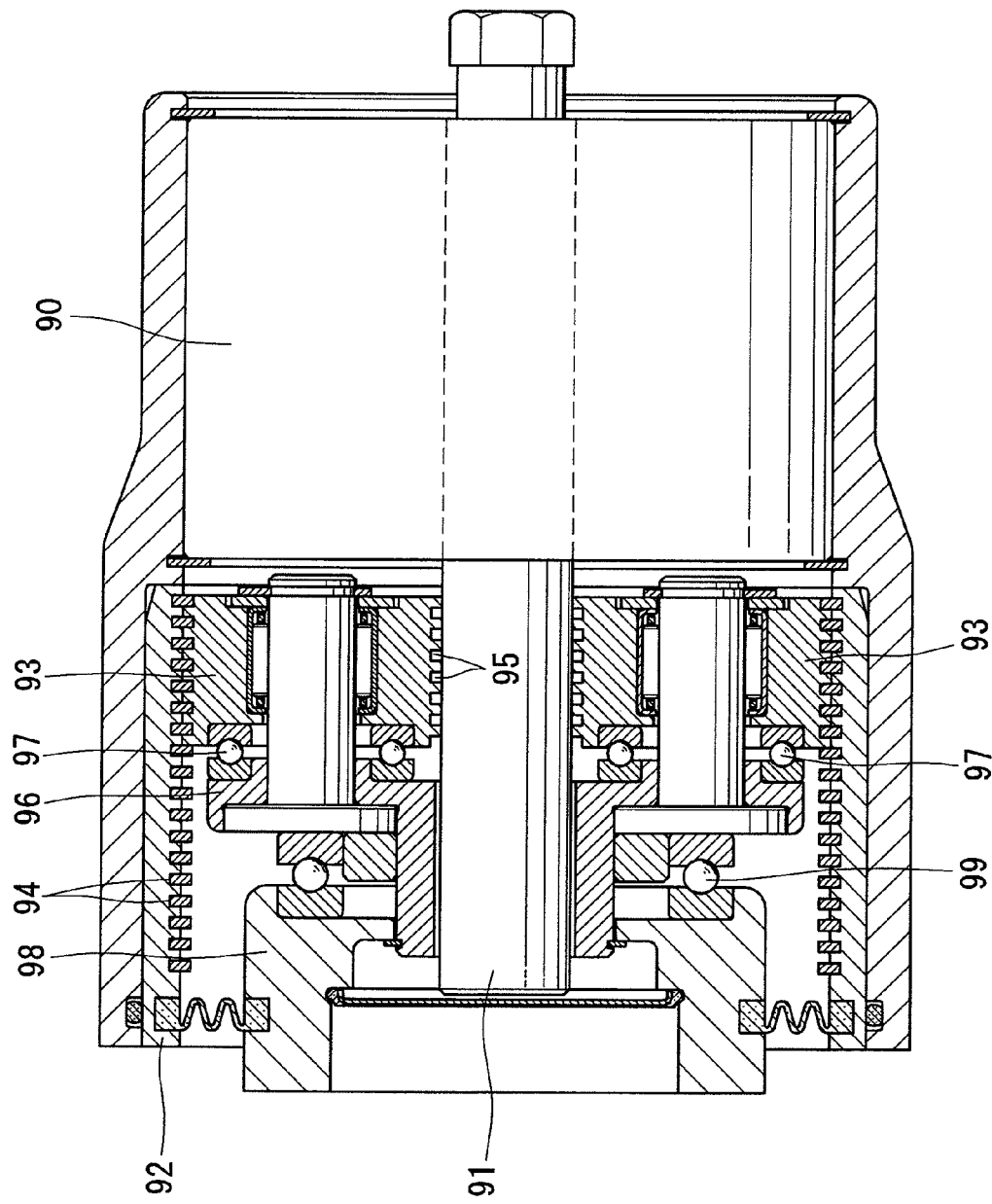

ELECTROMECHANICAL LINEAR-MOTION ACTUATOR AND ELECTROMECHANICAL BRAKE SYSTEM

BACKGROUND OF THE INVENTION

1. Technical Field

This invention relates to an electromechanical linear-motion actuator for converting the rotation of a rotary shaft driven by an electric motor to axial movement of planetary rollers, and an electromechanical brake system in which this electromechanical linear-motion actuator is used.

2. Background Art

Conventional vehicle brake systems are mostly hydraulic systems, of which brake pads are driven by hydraulic cylinders and pressed against a brake disc. But with an introduction of anti-lock brake systems (ABS) and other brake control arrangements, electromechanical brake systems, which use no hydraulic circuit, are gathering attention these days. An electromechanical brake system includes an electromechanical linear-motion actuator mounted in a caliper body to convert the rotation of a rotary shaft driven by an electric motor to axial movement of planetary rollers. The axial movement of the planetary rollers is transmitted to brake pads to press the brake pads against a brake rotor, thereby producing braking force.

FIG. 25 shows such an electromechanical linear-motion actuator, which comprises an electric motor 90 having a rotary shaft 91, a stationary outer race member 92 provided around the rotary shaft 91, a plurality of planetary rollers 93 disposed between the radially outer surface of the rotary shaft 91 and the radially inner surface of the outer race member 92 so as to be rotated about their own axes while revolving about the rotary shaft 91 when the rotary shaft 91 rotates. A helical rib 94 is provided on the radially inner surface of the outer race member 92, and a helical groove 95 is formed in a radially outer surface of each of the planetary rollers 93 in which the helical rib 94 is engaged. The actuator further includes a planetary carrier 96 axially facing the planetary rollers 93, thrust ball bearings 97 disposed between the planetary carrier 96 and the respective planetary rollers 93 for preventing the rotation of the respective planetary rollers 93 from being transmitted to the planetary carrier 96, a moving member 98 axially facing the planetary carrier 96, and a thrust rolling bearing 99 disposed between the moving member 98 and the planetary carrier 96 for preventing the revolving motion of the planetary carrier 96 from being transmitted to the moving member 98 (JP Patent Publication 2007-37305A).

In this electromechanical linear-motion actuator, when the rotary shaft 91 rotates, the planetary rollers 93 rotate about their own axes while revolving around the rotary shaft 91. Simultaneously, the planetary rollers 93 are moved axially with their helical grooves 95 guided by the helical rib 94 of the outer race member 92. The axial movement of the planetary rollers 93 is transmitted through the thrust ball bearings 97 and then the planetary carrier 96 to the moving member 98.

It is desired that such an electromechanical linear-motion actuator is as short in axial length as possible. The shorter the axial length of this actuator, the more it is possible to reduce the axial length of the electromechanical brake system. This in turn makes it possible to increase the freedom of layout of component parts around the electromechanical brake system (such as a suspension). But actually, the above-mentioned conventional electromechanical linear-motion actuator has a rather long axial length.

SUMMARY OF THE INVENTION

An object of the present invention is to provide an electromechanical linear-motion actuator having a short axial length.

In order to achieve this object, the present invention provides an electromechanical linear-motion actuator comprising a rotary shaft driven by an electric motor and having a radially outer surface, a stationary outer race member provided around the rotary shaft and having a radially inner surface, a plurality of planetary rollers disposed between the radially outer surface of the rotary shaft and the radially inner surface of the outer race member so as to be rotated about their own axes while revolving about the axis of the rotary shaft when the rotary shaft rotates, wherein a helical rib is provided on the radially inner surface of the outer race member or the radially outer surface of the rotary shaft, and wherein a helical groove or circumferential grooves are formed in a radially outer surface of each of the planetary rollers in which the helical rib is engaged, a planetary carrier axially facing the planetary rollers, and thrust rolling bearings disposed between the planetary carrier and the respective planetary rollers for preventing the rotation of the respective planetary rollers from being transmitted to the planetary carrier, characterized in that each of the thrust rolling bearings comprises a raceway formed on an axial end surface of the corresponding planetary roller. With this arrangement, it is possible to eliminate the need for a bearing race of each thrust rolling bearing on the planetary roller, and thus to reduce the axial length of the electromechanical linear-motion actuator by the amount equal to the axial thickness of this bearing race.

Preferably, each of the thrust rolling bearings of this electromechanical linear-motion actuator further comprises a raceway formed on an axial end surface of the planetary carrier. With this arrangement, it is possible to eliminate the need for a bearing race of each thrust rolling bearing on the planetary carrier too, and thus to further reduce the axial length of the electromechanical linear-motion actuator by the amount equal to the axial thickness of this bearing race.

The thrust rolling bearings may be thrust ball bearings or thrust roller bearings. The rolling elements of the thrust ball bearings may be made of a ceramic material. With this arrangement, since ceramic rolling elements are lower in specific gravity than rolling elements made of steel, the electromechanical linear-motion actuator can be made lightweight. Also, compared to rolling elements made of steel, rolling elements made of a ceramic material can keep high strength at high temperature, which increases durability of the electromechanical linear-motion actuator.

If the electromechanical linear-motion actuator further comprises a moving member axially facing the planetary carrier, and a thrust rolling bearing disposed between the moving member and the planetary carrier for preventing transmission of revolving motion of the planetary carrier to the moving member, this thrust rolling bearing preferably includes a raceway formed on the planetary carrier. With this arrangement, it is possible to eliminate the need for a bearing race of this thrust rolling bearing on the planetary carrier, and thus to shorten the axial length of the electromechanical linear-motion actuator by the amount equal to the axial thickness of this bearing race.

The thrust rolling bearing for preventing transmission of revolving motion of the planetary carrier to the moving member may further include a raceway formed on the moving member. With this arrangement, it is possible to eliminate the need for a bearing race of this thrust rolling bearing on the moving member too, and thus to further shorten the axial length of the electromechanical linear-motion actuator by the amount equal to the axial thickness of this bearing race. The rolling elements of this thrust rolling bearing may be made of a ceramic material to further reduce the weight of this electromechanical linear-motion actuator and further improve its durability at high temperature.

The present invention also provides an electromechanical brake system comprising a brake pad, a brake disc and the above-described electromechanical linear-motion actuator for driving and pressing the brake pad against the brake disc.

In the electromechanical linear-motion actuator according to this invention, one of the raceways of each thrust rolling bearing is formed on the axial end surface of the planetary roller, it is possible to eliminate the need for the bearing race of each thrust rolling bearing on the planetary roller, and thus to shorten the axial length of the actuator by the amount equal to the axial thickness of this bearing race.

Further, by forming the other raceway of each thrust rolling bearing on the axial end surface of the planetary carrier, it is possible to eliminate the need for the bearing race of each thrust rolling bearing on the planetary carrier too, and thus to further shorten the axial length of the electromechanical linear-motion actuator by the amount equal to the axial thickness of this bearing race.

In the arrangement in which the electromechanical linear-motion actuator further comprises a moving member axially facing the planetary carrier, and a thrust rolling bearing disposed between the moving member and the planetary carrier for preventing transmission of revolving motion of the planetary carrier to the moving member, wherein one of the raceway of this thrust rolling bearing is formed on the planetary carrier, it is possible to eliminate the need for the bearing race of this thrust rolling bearing on the planetary carrier, and thus to shorten the axial length of the electromechanical linear-motion actuator by the amount equal to the axial thickness of this bearing race.

Further, by forming the other raceway of the thrust rolling bearing for preventing transmission of revolving motion of the planetary carrier to the moving member on the moving member, it is possible to eliminate the need for the bearing race of this thrust rolling bearing on the moving member too, and thus to further shorten the axial length of the electromechanical linear-motion actuator by the amount equal to the axial thickness of this bearing race.

An electromechanical brake system of which the brake pads are driven by this electromechanical linear-motion actuator and pressed against the brake disc is also short in axial length. Thus, by mounting such an electromechanical brake system on a vehicle, it is possible to increase the freedom of layout of component parts surrounding the electromechanical brake system.

BRIEF DESCRIPTION OF THE DRAWINGS

FIG. 25 is a sectional view of a conventional electromechanical linear-motion actuator.

DETAILED DESCRIPTION OF THE INVENTION

Figure 1:
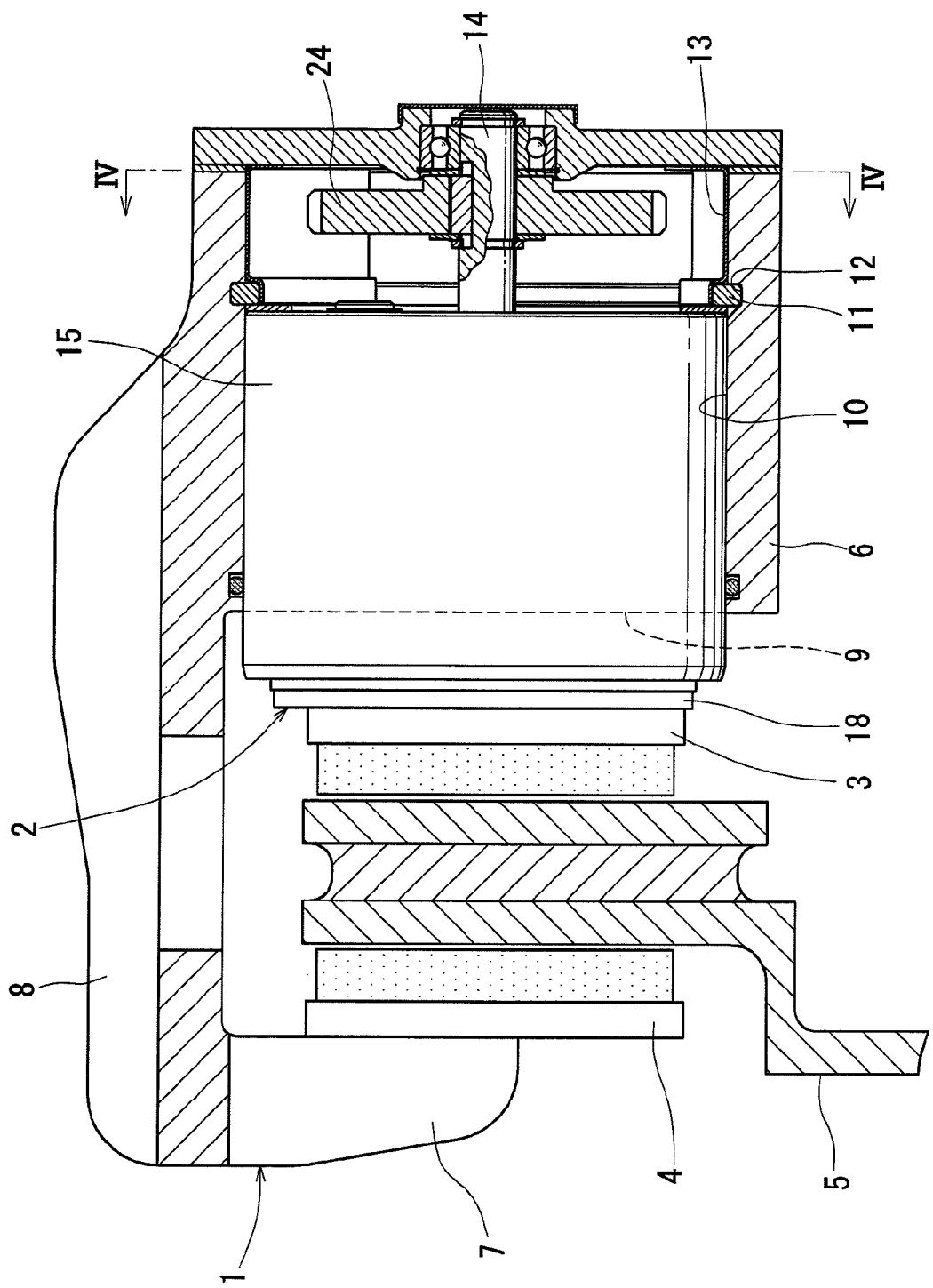
FIG. 1 is a sectional view of an electromechanical brake system in which is mounted an electromechanical linear-motion actuator according to a first embodiment of the present invention.

FIG. 1 shows an electromechanical brake system for use in vehicles. This electromechanical brake system comprises a caliper body 1, an electromechanical linear-motion actuator 2 according to a first embodiment of the present invention, brake pads 3 and 4, and a brake disc 5.

The caliper body 1 comprises opposed portions 6 and 7 that oppose each other with the brake disc 5, which rotates together with a wheel, disposed therebetween, and a bridge portion 8 connecting the opposed portions 6 and 7 together. The caliper body 1 is supported on slide pins (not shown) so as to be axially slidable relative to the brake disc 5. An insertion hole 10 is formed in the surface 9 of the opposed portion 6 that opposes the brake disc 5. The electromechanical linear-motion actuator 2 is inserted in the insertion hole 10.

The brake pad 3 is disposed between the electromechanical linear-motion actuator 2 and the brake disc 5, and supported on pad pins (not shown) so as to be axially slidable relative to the caliper body 1. The other brake pad 4 is also supported on pad pins (not shown) and disposed between the opposed portion 7 and the brake disc 5.

In the insertion hole 10, an annular stopper 11 is provided and supports the reaction force applied to the electromechanical linear-motion actuator 2 when the actuator 2 presses the brake pad 3.

Figure 2:
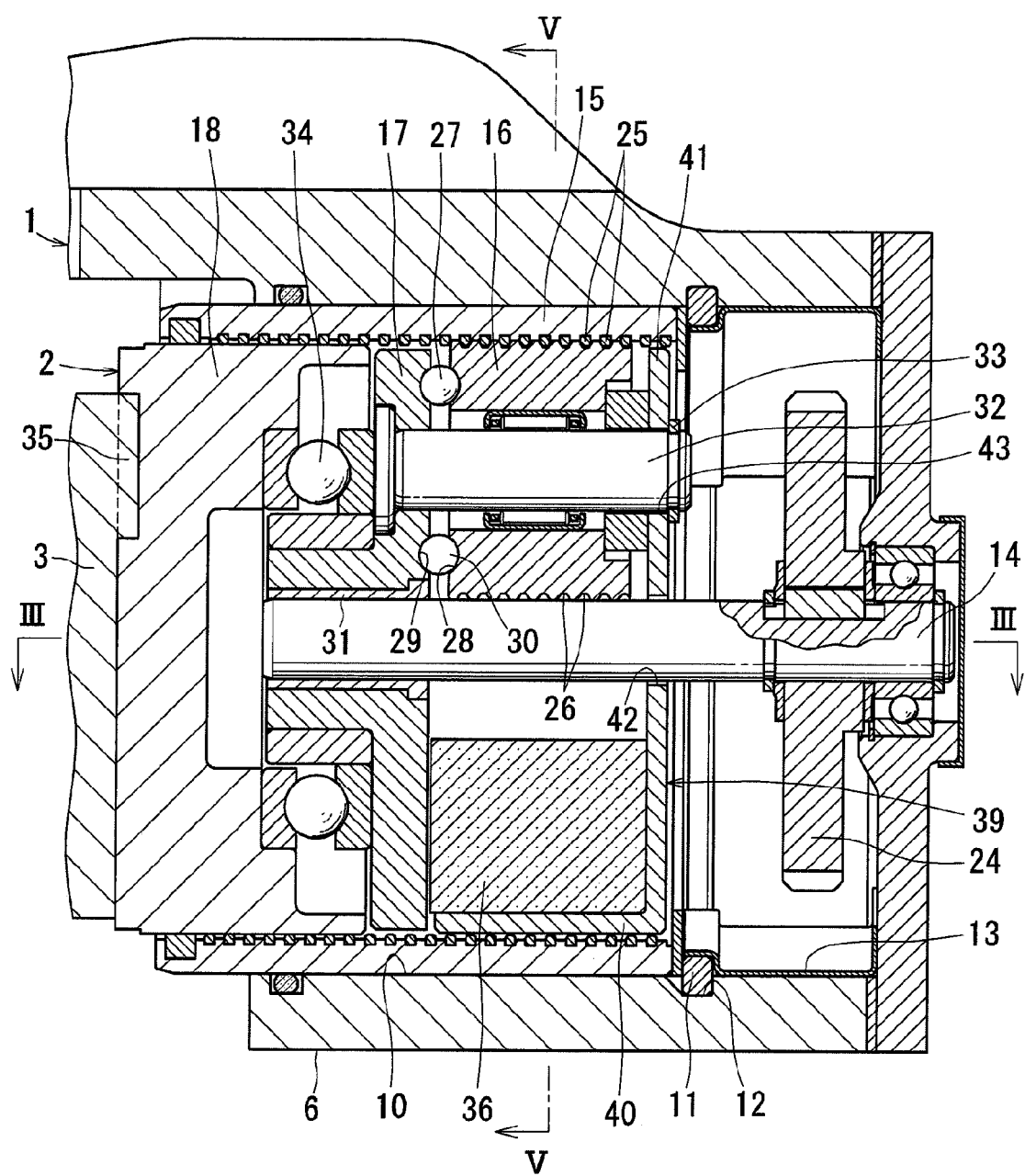
FIG. 2 is an enlarged sectional view of the electromechanical linear-motion actuator of the electromechanical brake system shown in FIG. 1 and the surroundings thereof.
Figure 3:
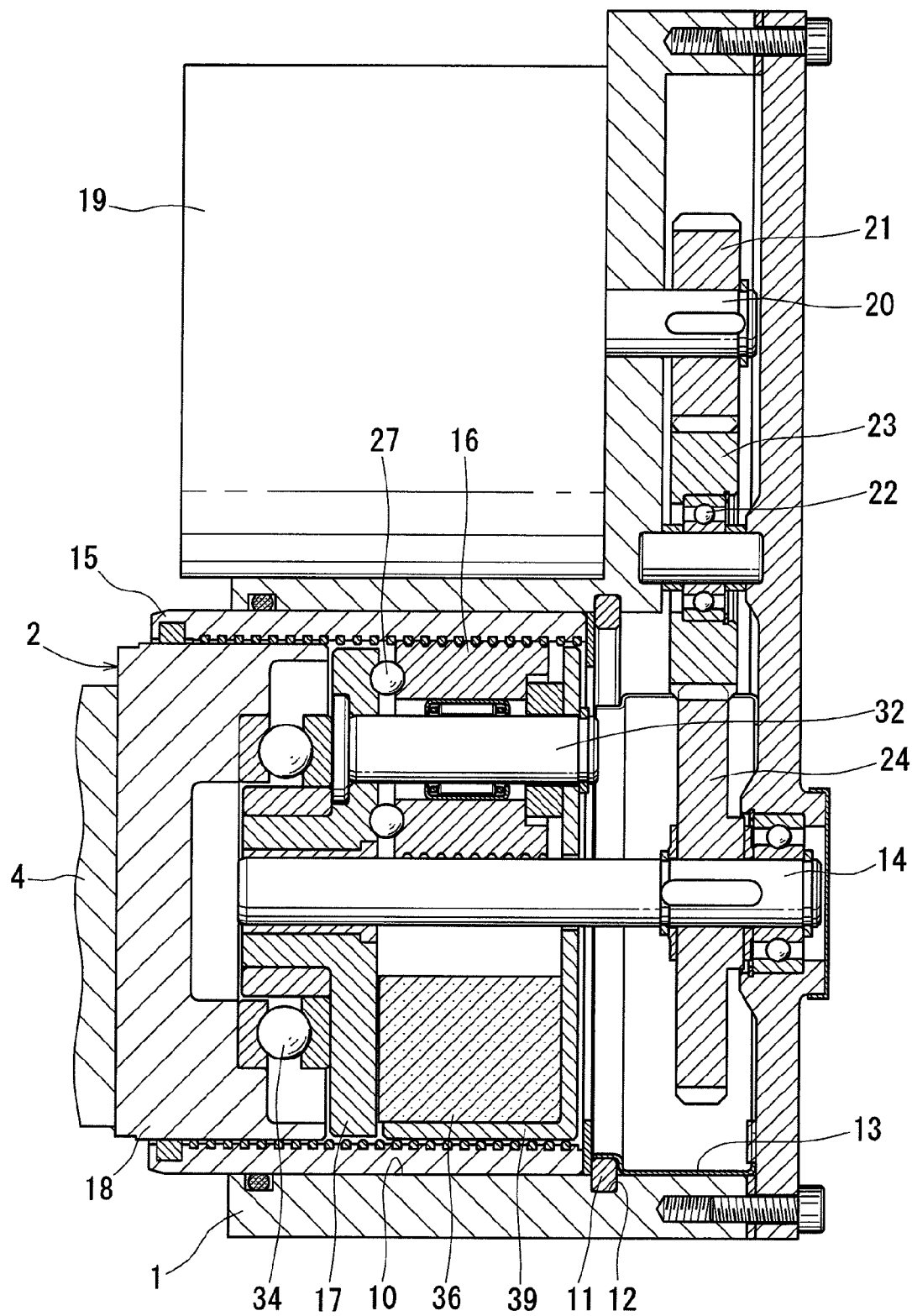
FIG. 3 is a sectional view taken along line III-III of FIG. 2.
Figure 4:
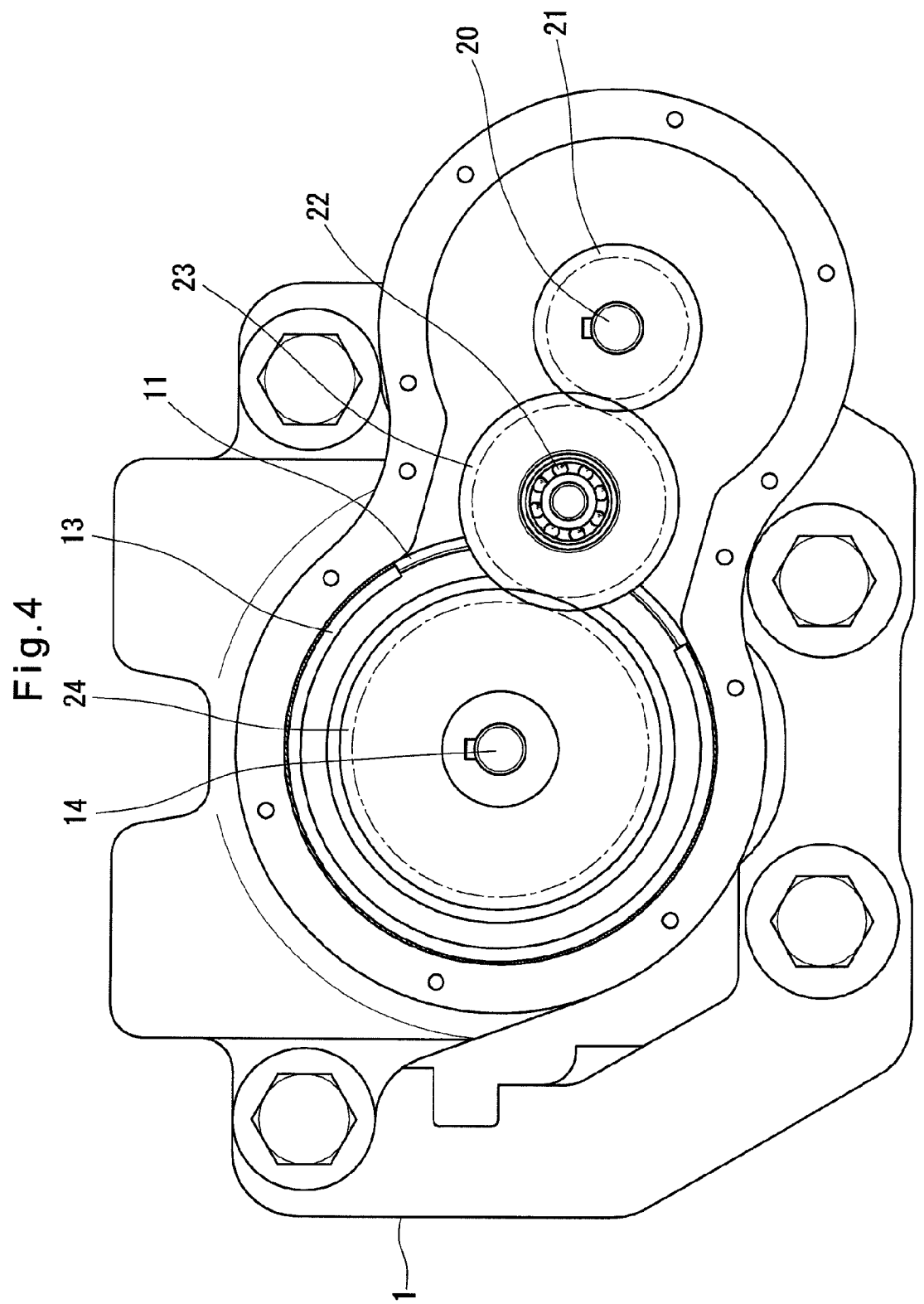
FIG. 4 is a sectional view taken along line IV-IV of FIG. 1.

As shown in FIGS. 2 and 3, the electromechanical linear-motion actuator 2 includes a rotary shaft 14, an outer race member 15, planetary rollers 16, a planetary carrier 17, a brake pad moving member 18 and an electric motor 19. As shown in FIG. 3, the rotary shaft 14 is coaxially mounted inside the outer race member 15. The electric motor 19 is disposed parallel to the outer race member 15. As shown in FIG. 4, the electric motor 19 has an output shaft 20 connected to the rotary shaft 14 through a gear 21 fixed to the output shaft 20, an intermediate gear 23 rotatably supported by a bearing 22, and a gear 24 fixed to the rotary shaft 14 in this order. The rotary shaft 14 is thus driven by the electric motor 19.

As shown in FIG. 2, the outer race member 15 is fixed in position around the rotary shaft 14. The planetary rollers 16 are disposed between the radially outer surface of the rotary shaft 14 and the radially inner surface of the outer race member 15 so as to be circumferentially spaced from each other. The planetary rollers 16 have their radially outer surfaces in contact with the radially outer surface of the rotary shaft 14 so that the rotation of the rotary shaft 14 is transmitted to the respective planetary rollers 16 due to the friction between the contact surfaces of the rotary shaft and the planetary rollers.

On the radially inner surface of the outer race member 15, a helical rib 25 is formed by the protruding portion of a helical rib member fitted in a helical groove formed in the radially inner surface of the outer race member 15. The helical rib 25 is engaged in helical grooves 26 formed in the respective planetary rollers 16. The helical rib 25 has a different lead angle from that of the helical grooves 26, so that when the planetary rollers 16 rotate, the planetary rollers 16 are moved axially with the helical grooves 26 of the planetary rollers 16 guided by the helical rib 25.

The planetary carrier 17 axially faces the planetary rollers 16 with a thrust ball bearing 27 disposed between each planetary roller 16 and the planetary carrier 17 to prevent the rotation of each planetary roller 16 about its axis from being transmitted to the planetary carrier 17. Each thrust ball bearing 27 comprises a raceway 28 formed on the axial end face of the corresponding planetary roller 16, a raceway 29 formed on the axial end face of the planetary carrier 17, and balls 30 made of a ceramic material and disposed between the raceways 28 and 29. Thus, the balls 30 are in direct contact with the planetary roller 16 and the planetary carrier 17. The ceramic material forming the balls 30 may be silicon nitride, silicon carbide or zirconia.

The planetary carrier 17 is supported on the rotary shaft 14 through a slide bearing 31 so as to be rotatable about the rotary shaft 14 and axially movable relative to the rotary shaft 14. The planetary carrier 17 has support shafts 32 fixed thereto and rotatably supporting the respective planetary rollers 16 so that the planetary carrier 17 revolves around the axis of the rotary shaft 14 together with the planetary rollers 16. A snap ring 33 is fitted on the outer periphery of each support shaft 32 near its free end to axially move the planetary rollers 16 together with the planetary carrier 17.

The brake pad moving member 18 axially faces the planetary carrier 17 with a thrust ball bearing 34 disposed therebetween to prevent the revolution of the planetary carrier 17 about the rotary shaft 14 from being transmitted to the brake pad moving member 18. The brake pad moving member 18 is rotationally fixed to the caliper body 1 through the brake pad 3 by means of keys 35 formed on the back of the brake pad 3.

Figure 5:
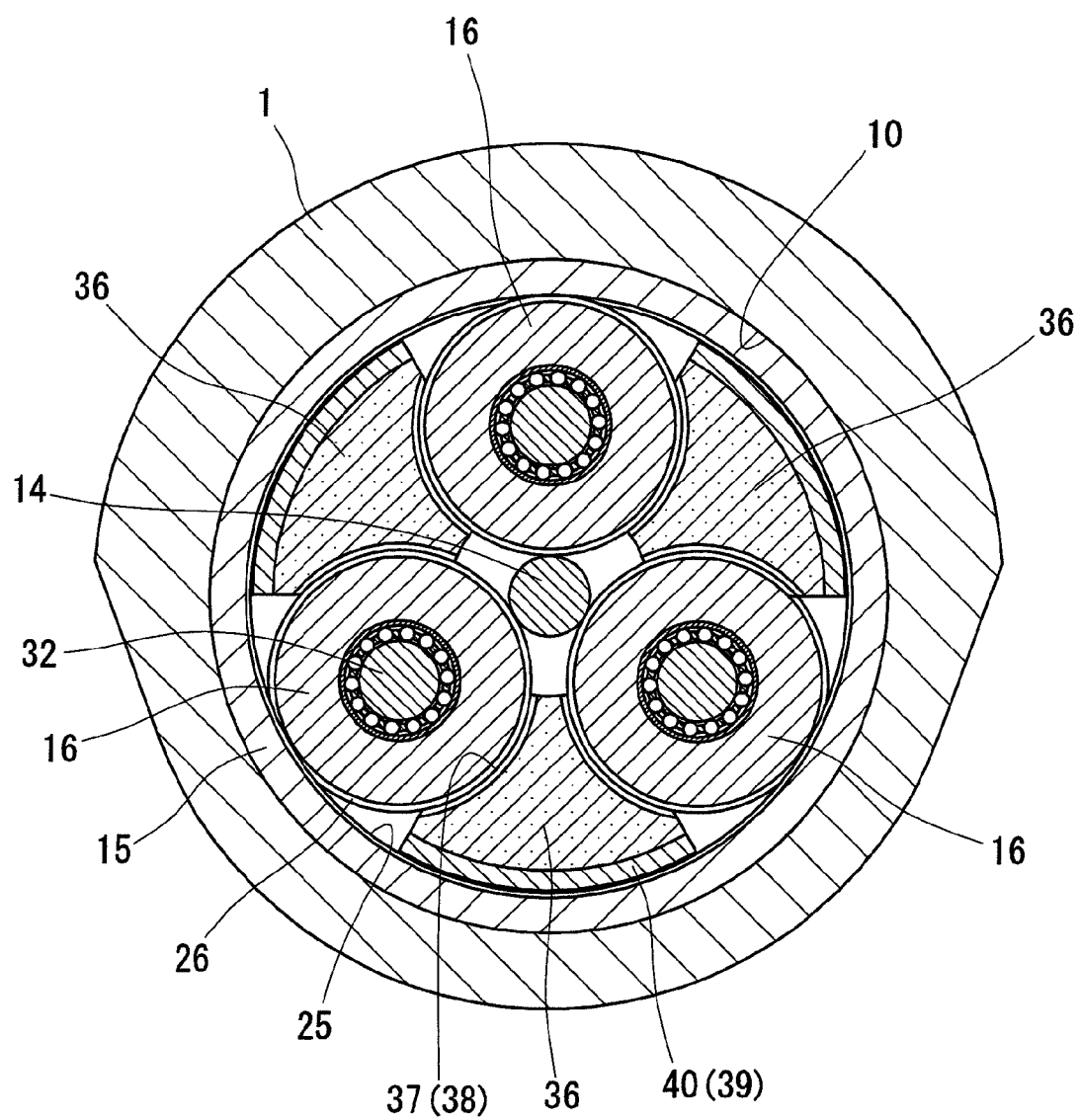
FIG. 5 is a sectional view taken along line V-V of FIG. 2.
Figure 6:
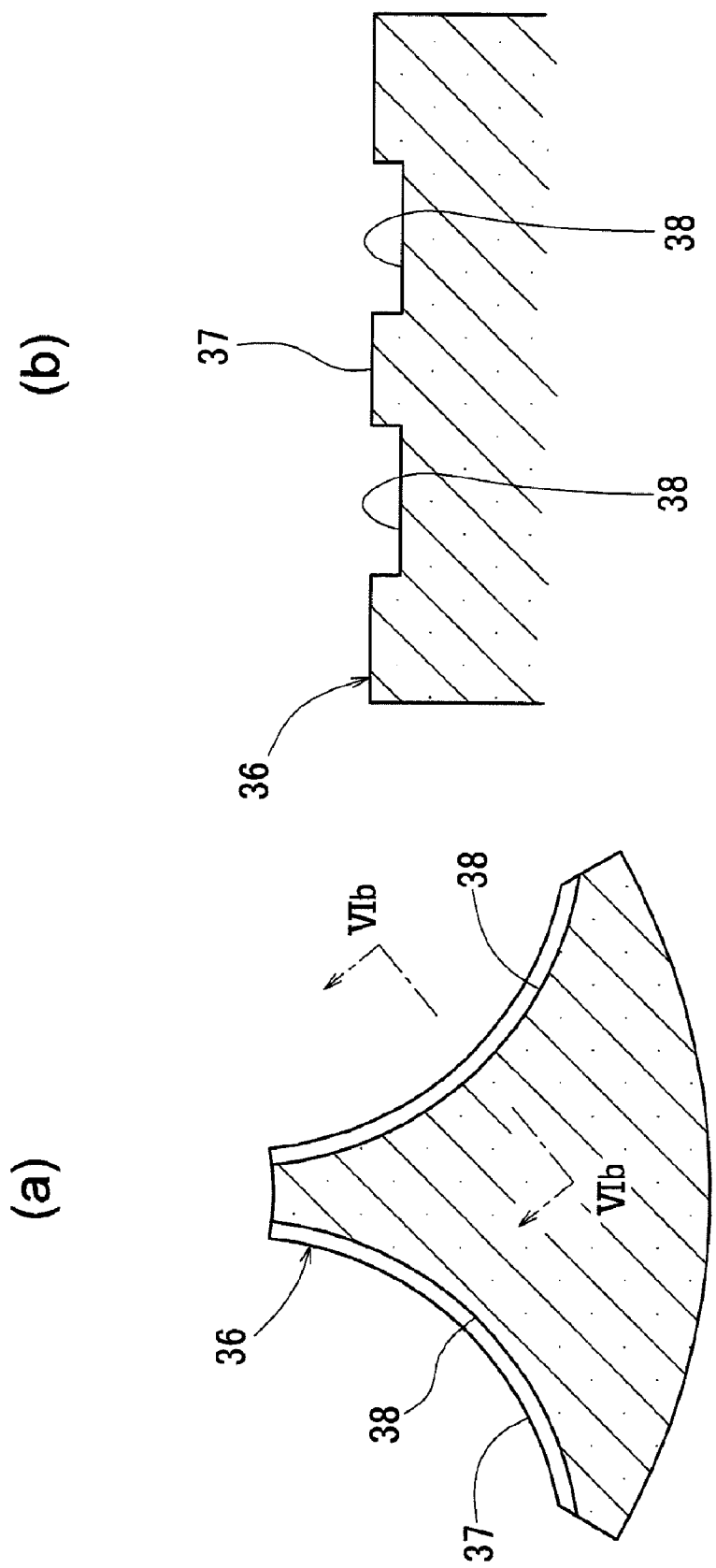
FIG. 6(a) is an enlarged sectional view of a lubricant applying member shown in FIG. 5.
FIG. 6(b) is an enlarged sectional view taken along line VIb-VIb of FIG. 6(a).
Figure 7:
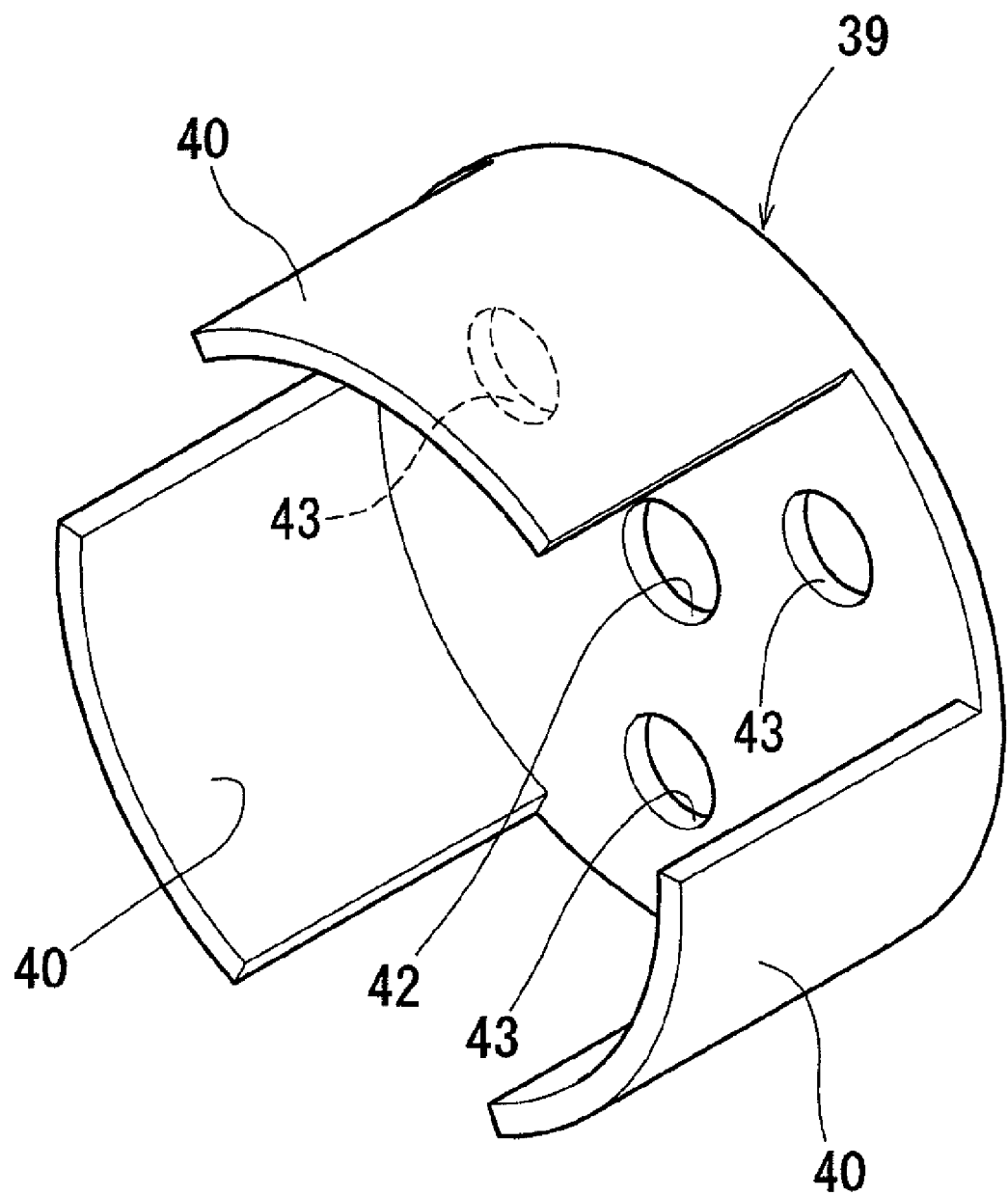
FIG. 7 is a perspective view of a case for the lubricant applying members shown in FIG. 2.

As shown in FIG. 5, between any adjacent planetary rollers 16, a fan-shaped lubricant applying member 36 is disposed so as to be in sliding contact with the radially outer surfaces of the respective planetary rollers 16. Lubricant sealed in the outer race member 15 is applied to the radially outer surfaces of the planetary rollers 16. As shown in FIGS. 6(a) and 6(b), grooves 38 are formed in contact surfaces 37 of each lubricant applying member 36 that are brought into contact with the respective planetary rollers 16 to retain lubricant therein. The lubricant applying members 36 are supported by a case 39 shown in FIG. 7.

The case 39 comprises part-cylindrical portions 40 supporting the radially outer surfaces of the respective lubricant applying members 36, and a bottom portion 41 supporting the axial ends of the lubricant applying members 36. The bottom portion 41 is formed with a hole 42 through which the rotary shaft 32 extends, and holes 43 through which the respective support shafts 32 extend. As shown in FIG. 2, the bottom portion 41 is axially fixed to the support shafts 32 by the snap rings 33, so that the case 39 is axially moved together with the planetary carrier 17.

Now the operation of this electromechanical brake system is described.

When the electric motor 19 is activated, the rotary shaft 14 rotates, so that the planetary rollers 16 revolve around the rotary shaft 14, while rotating about their own axes. In this state, because the helical rib 25 is engaged in the helical grooves 26, the planetary rollers 16 move axially, and this axial movement of the planetary rollers 16 is transmitted through the thrust ball bearings 27, planetary carrier 17, thrust ball bearing 34 and brake pad moving member 18, in this order, to the brake pad 3. The brake pad 3 is thus pressed against the brake disc 5. Simultaneously, due to the reaction force applied to the brake pad 3, the caliper body 1 slides to press the brake pad 4 against the brake disc 5. Thus, in this electromechanical brake system, the electromechanical linear-motion actuator 2 drives the brake pad 3 to press the brake pads 3 and 4 against the brake disc 5, thereby producing braking force.

This electromechanical linear-motion actuator 2 needs neither of the bearing races for each thrust ball bearing 27 on the planetary roller 16 and the planetary carrier 17, and thus is shorter in axial length than conventional such actuators by the amount equal to the sum of the axial thicknesses of these bearing races. The electromechanical brake system in which this electromechanical linear-motion actuator 2 is mounted is therefore also shorter in axial length, so that by mounting this electromechanical brake system in a vehicle, freedom of layout of parts around this electromechanical brake system (such as a suspension) increases.

Also, because the outer race member 15 and the electric motor 19 are arranged parallel to each other, the electromechanical linear-motion actuator 2 of this embodiment is shorter in axial length than conventional such actuators in which the outer race member and the electric motor are arranged coaxially and in series with each other, by the amount equal to the length of the portion of the outer race member 15 that overlaps with the electric motor 19 in the direction perpendicular to the axial direction.

Further, since the balls 30 of the electromechanical linear-motion actuator 2 are made of a ceramic material, the balls 30 are lower in specific gravity and thus are lighter in weight than when the balls 30 are made of steel.

Moreover, since the balls 30 of the electromechanical linear-motion actuator 2 are made of a ceramic material, the strength of the balls 30 is less likely to decrease at an elevated temperature than when the balls 30 are made of steel. This prevents flaking of the balls 30 even when the balls 30 are heated to high temperature due to frictional heat produced between the brake pad 3 and the brake disc 5, which in turn ensures high durability of the electromechanical linear-motion actuator 2.

Figure 8:
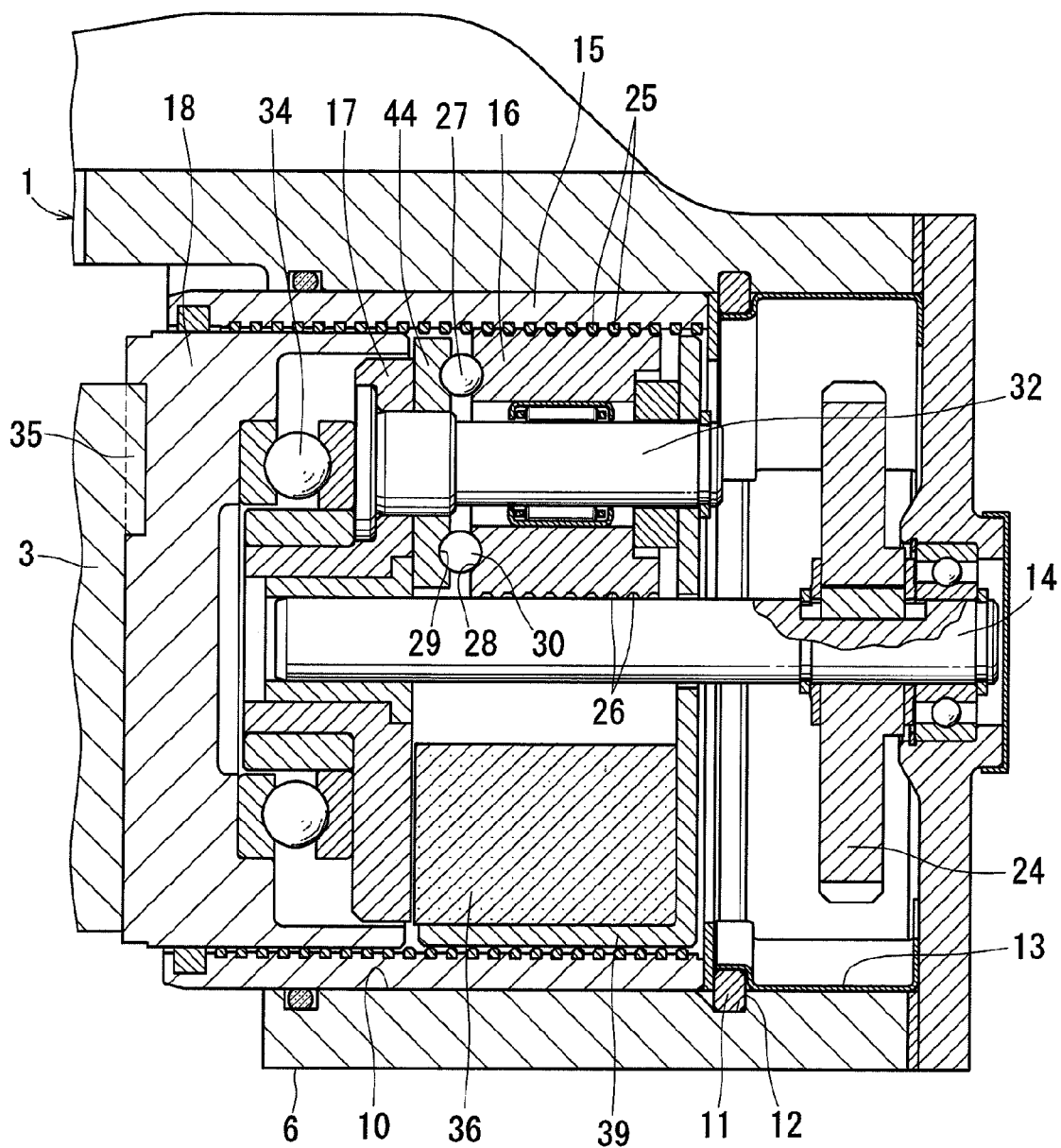
FIG. 8 is an enlarged sectional view of a modified example of the electromechanical linear-motion actuator shown in FIG. 2.

In this embodiment, the raceways 28 are formed on the axial end faces of the respective planetary rollers 16, and the raceways 29 are formed on the axial end face of the planetary carrier 17. But instead, as shown in FIG. 8, each raceway 29 may be formed on a bearing race 44 disposed between the balls 30 and the planetary carrier 17. With this arrangement too, because no bearing race is necessary for each thrust ball bearing 27 on the planetary roller 16, it is possible to reduce the axial length of the electromechanical linear-motion actuator by the amount equal to the axial thickness of this bearing race.

Figure 9:
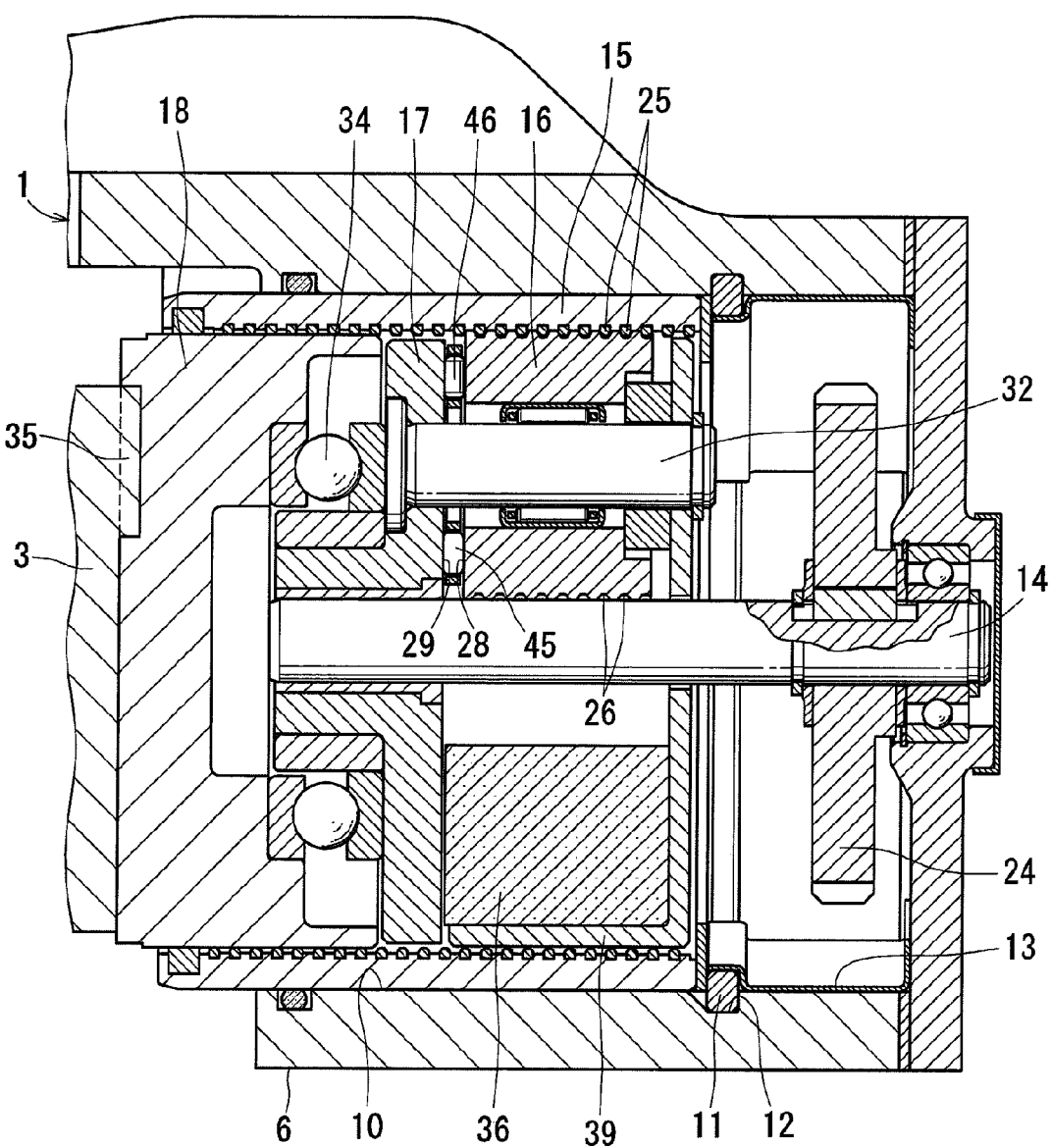
FIG. 9 is an enlarged sectional view of another modified example of the electromechanical linear-motion actuator shown in FIG. 2.

In the above embodiment, the thrust ball bearings 27 are used to prevent the rotation of the respective planetary rollers 16 about their respective axes from being transmitted to the planetary carrier 17. But for this purpose, the thrust ball bearings 27 may be replaced with thrust roller bearings 46 including rollers 45 as rolling elements, as shown in FIG. 9. In this case too, the rollers 45 are preferably made of a ceramic material because a ceramic material is lower in specific gravity than steel, so that it is possible to reduce the weight of the electromechanical linear-motion actuator 2. Also, since the strength of the ceramic rollers 45 is less likely to decrease at an elevated temperature than when the rollers 45 are made of steel, it is possible to increase the durability of the electromechanical linear-motion actuator 2.

Figure 10:
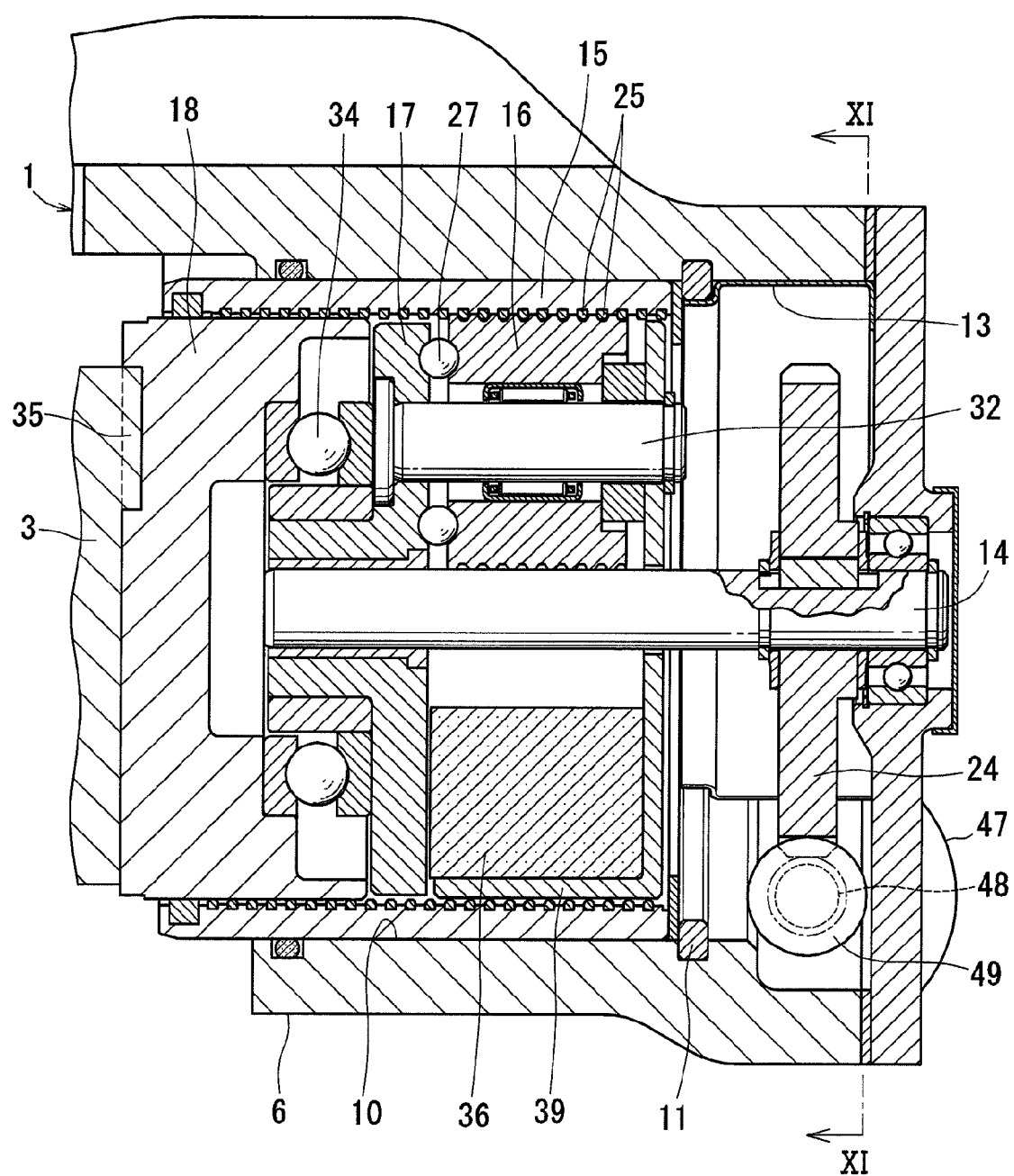
FIG. 10 is an enlarged sectional view of still another modified example of the electromechanical linear-motion actuator shown in FIG. 2.
Figure 11:
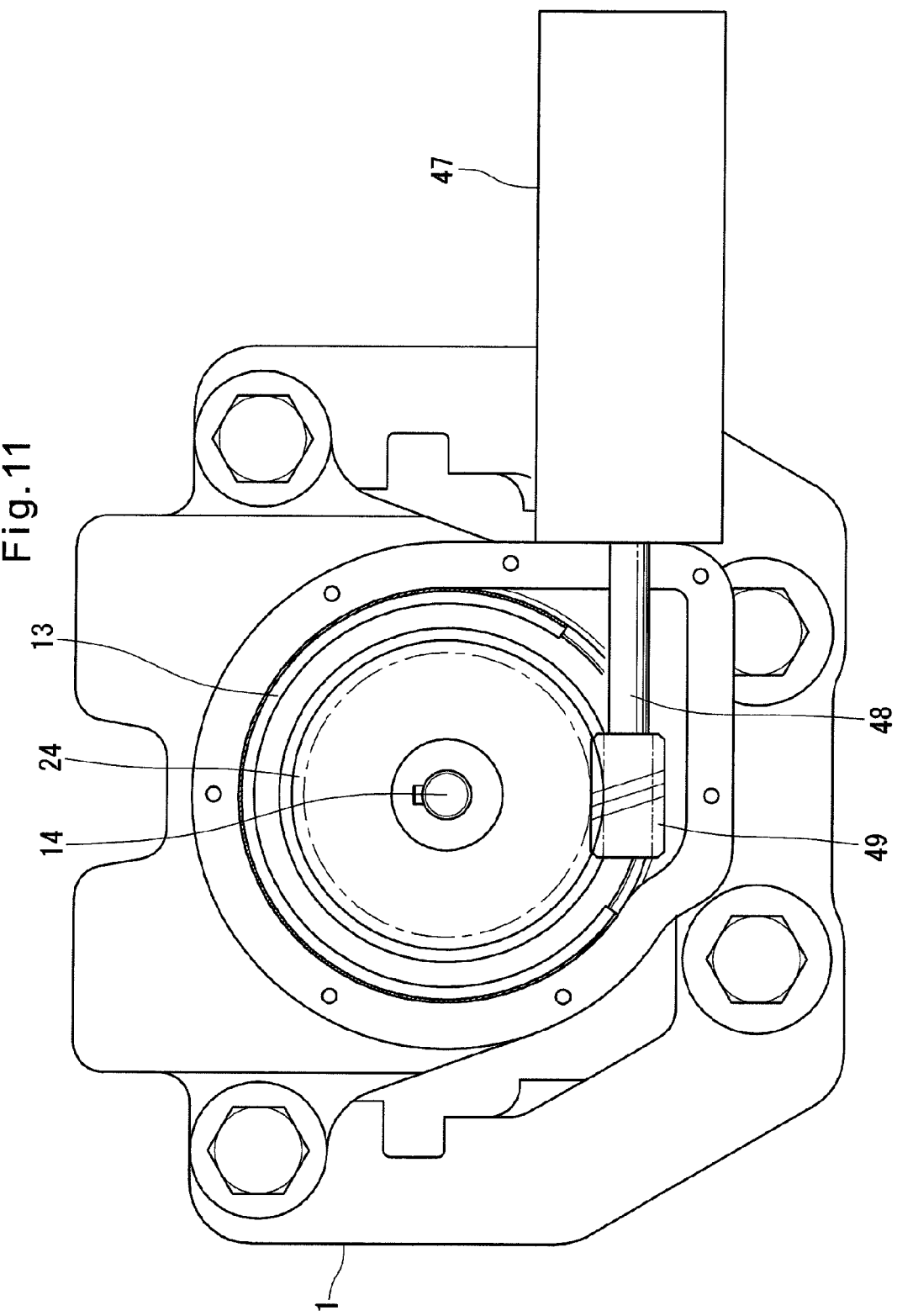
FIG. 11 is a sectional view taken along line XI-XI of FIG. 10.

In the above embodiment, the electric motor 19 and the outer race member 15 are arranged parallel to each other. But as shown in FIGS. 10 and 11, the electric motor 47 may be arranged perpendicular to the outer race member 15 with a worm 49 that is fixed to the output shaft 48 of the electric motor 47 meshing with a gear 24 fixed to the rotary shaft 14. With this arrangement, because the electric motor 47 extends perpendicular to the axis of the outer race member 15, even if the electric motor 47 has a large axial length, the axial length of the electromechanical linear-motion actuator does not increase.

Figure 12:
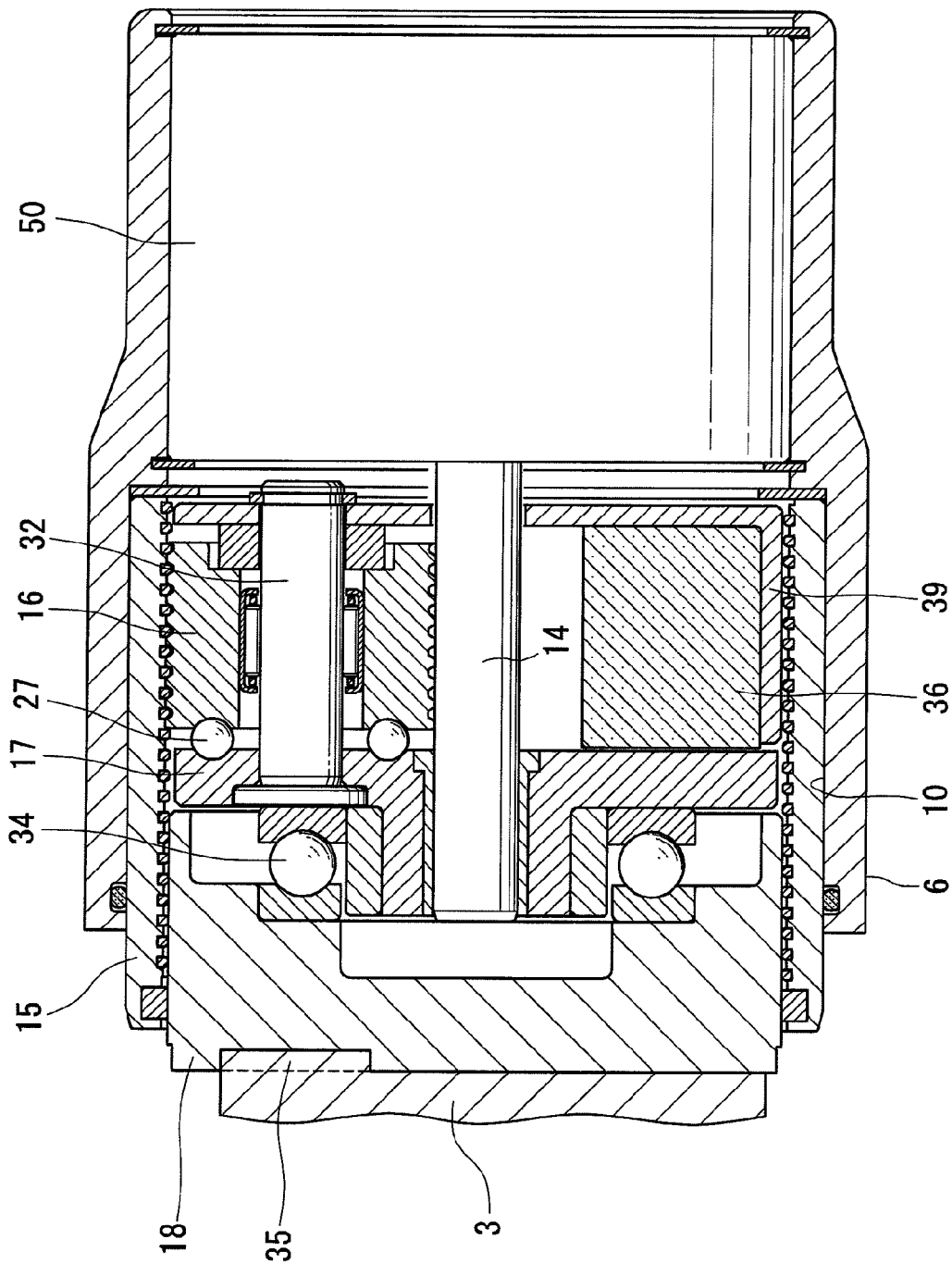
FIG. 12 is an enlarged sectional view of yet another modified example of the electromechanical linear-motion actuator shown in FIG. 2.

As shown in FIG. 12, the electric motor 50 may be arranged so as to be coaxial with the outer race member 15, with the output shaft of the electric motor 50 used as the rotary shaft 14. With this arrangement, since the rotary shaft 14 is directly driven by the electric motor 50, no gears are necessary between the electric motor 50 and the rotary shaft 14. Thus, it is possible to reduce the manufacturing cost and to improve operational reliability.

Figure 13:
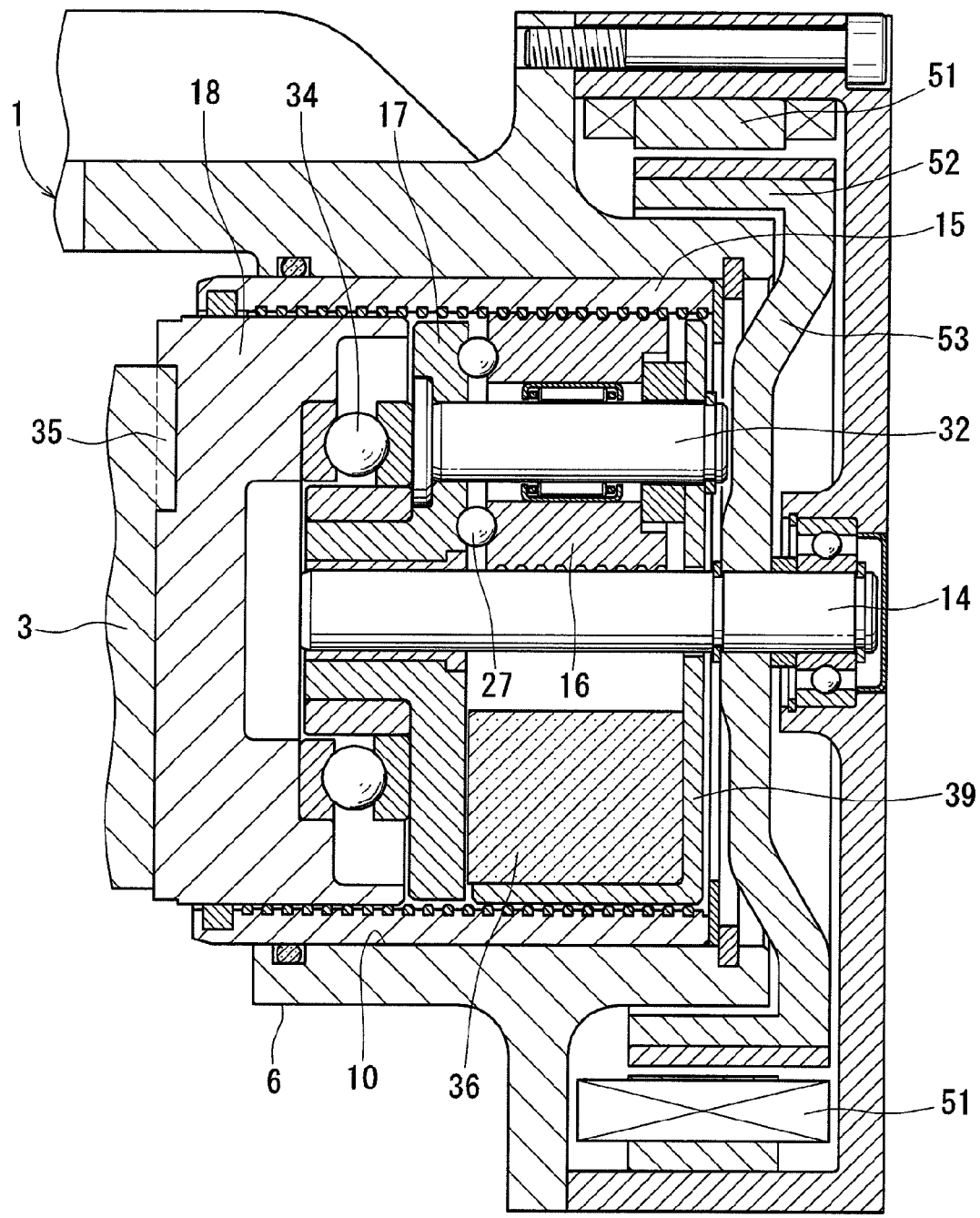
FIG. 13 is an enlarged sectional view of yet another modified example of the electromechanical linear-motion actuator shown in FIG. 2.

As shown in FIG. 13, the electric motor for driving the rotary shaft 14 may comprise a stator 51 surrounding the radially outer surface of the outer race member 15, and a tubular rotor 52 disposed radially inside of the stator 51 and coupled to the rotary shaft 14 through a radially inwardly extending coupling portion 53 integrally provided on the rotor 52. With this arrangement, since the outer race member 15 and the stator 51 radially overlap with each other, it is possible to shorten the axial length of the linear-motion actuator.

Figure 14:
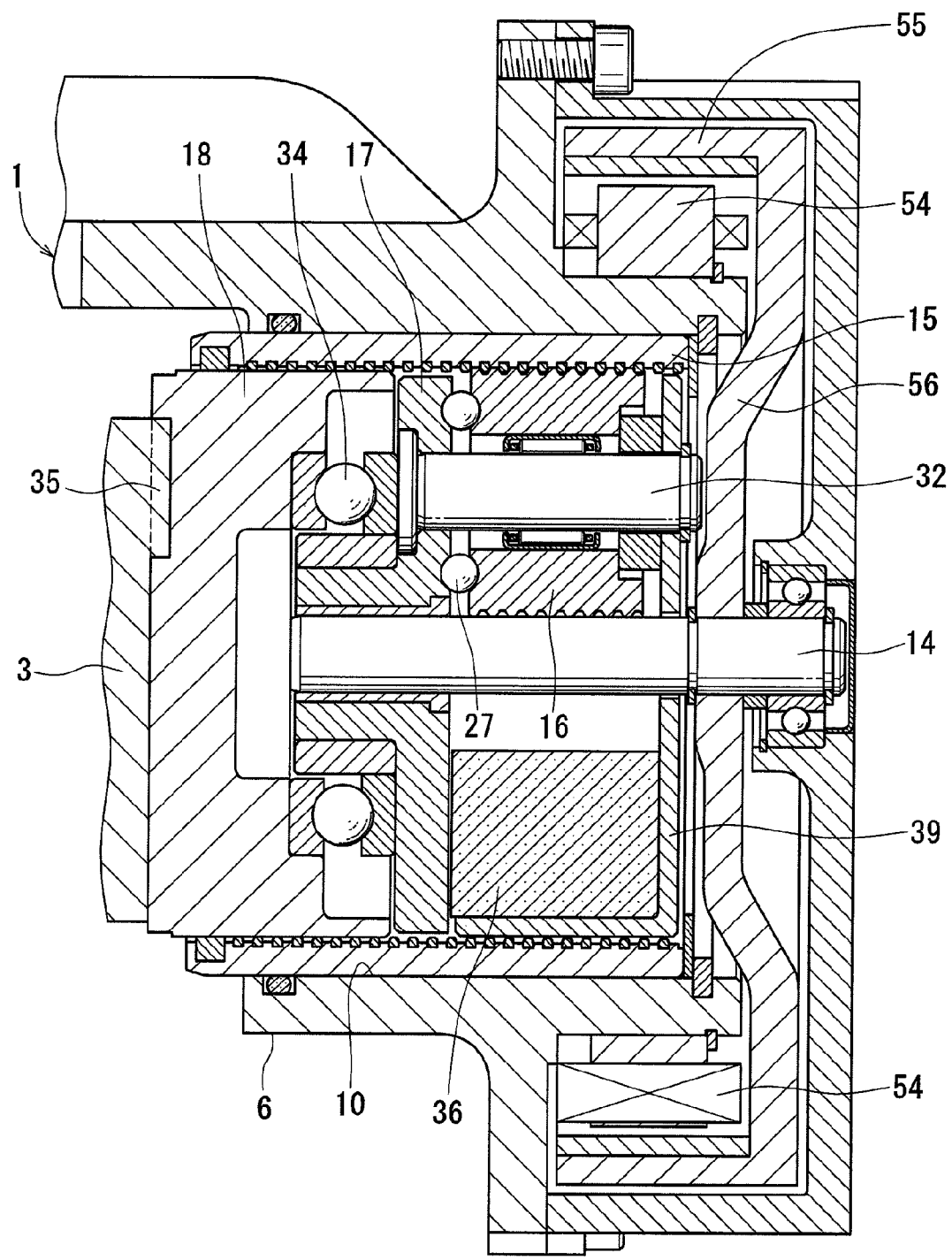
FIG. 14 is an enlarged sectional view of yet another modified example of the electromechanical linear-motion actuator shown in FIG. 2.

As shown in FIG. 14, the electric motor for driving the rotary shaft 14 may comprise a stator 54 surrounding the radially outer surface of the outer race member 15, and a rotor 55 provided around the stator 54 and coupled to the rotary shaft 14 through a radially inwardly extending coupling portion 56 integrally provided on the rotor 55. With this arrangement, since the outer race member 15 and the stator 54 radially overlap with each other, it is possible to shorten the axial length of the linear motion actuator. Also, compared to the electromechanical linear-motion actuator shown in FIG. 13, the surface of the rotor 55 facing the stator 54 has a large turning radius, so that large torque acts on the rotor 55. This improves brake response of the electromechanical brake system in which this electromechanical linear-motion actuator is mounted.

Figure 15:
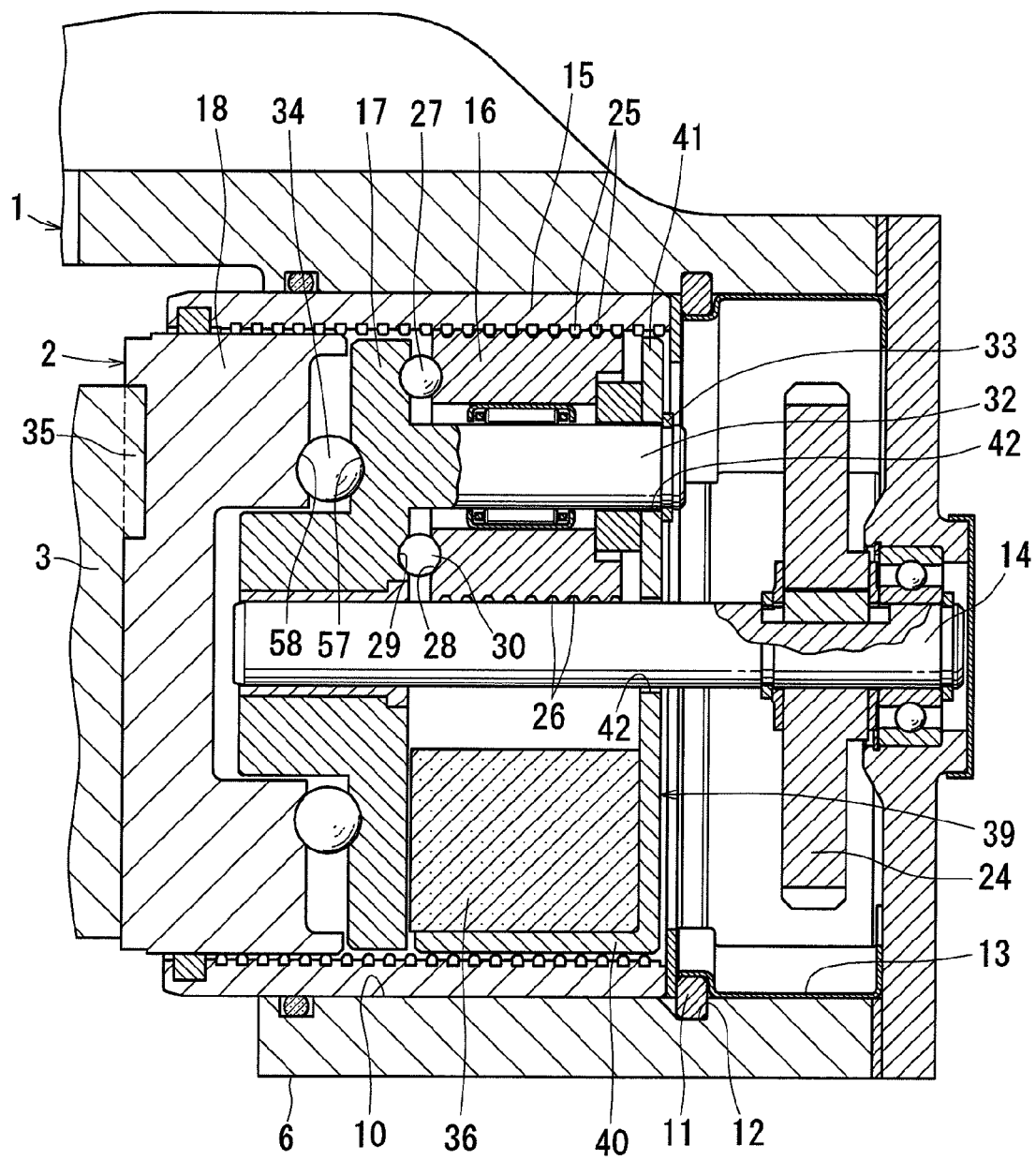
FIG. 15 is an enlarged sectional view of yet another modified example of the electromechanical linear-motion actuator shown in FIG. 2.

As shown in FIG. 15, the thrust ball bearing 34 may have its raceway 57 formed on the planetary carrier 17 and the other raceway 58 formed on the brake pad moving member 18. With this arrangement, it is possible to omit both the bearing races of the thrust ball bearing 34, i.e. the bearing races on the planetary carrier 17 and on the brake pad moving member 18, to thus reduce the axial length of the electromechanical linear-motion actuator 2 by the amount equal the sum of the axial thicknesses of these bearing races. By using rolling elements made of a ceramic material as the rolling elements of the thrust ball bearing 34, it is possible to further reduce the weight of the electromechanical linear-motion actuator and also improve its durability in a high-temperature environment.

Figure 16:
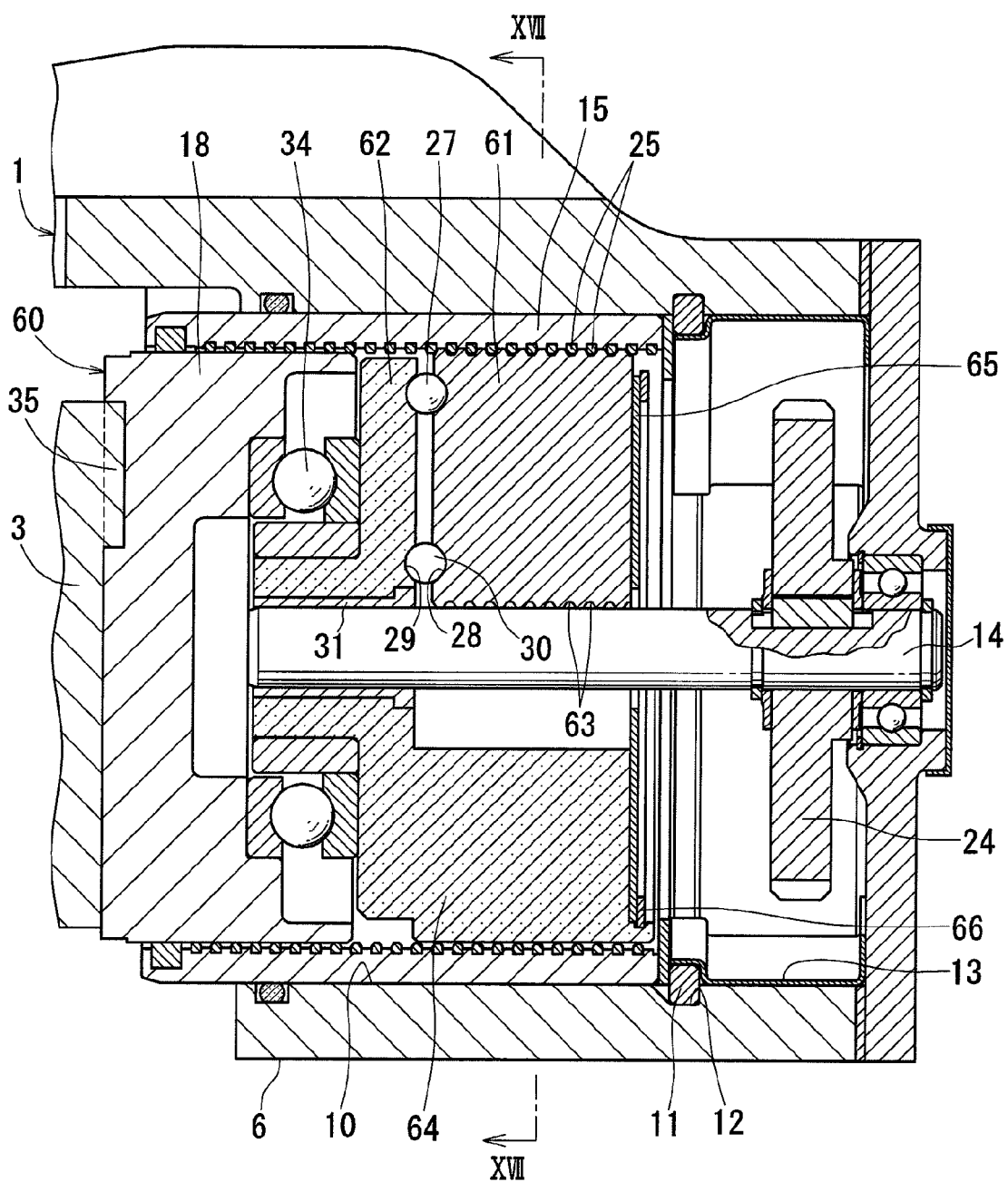
FIG. 16 is an enlarged sectional view of an electromechanical brake system in which is mounted an electromechanical linear-motion actuator of a second embodiment.
Figure 17:
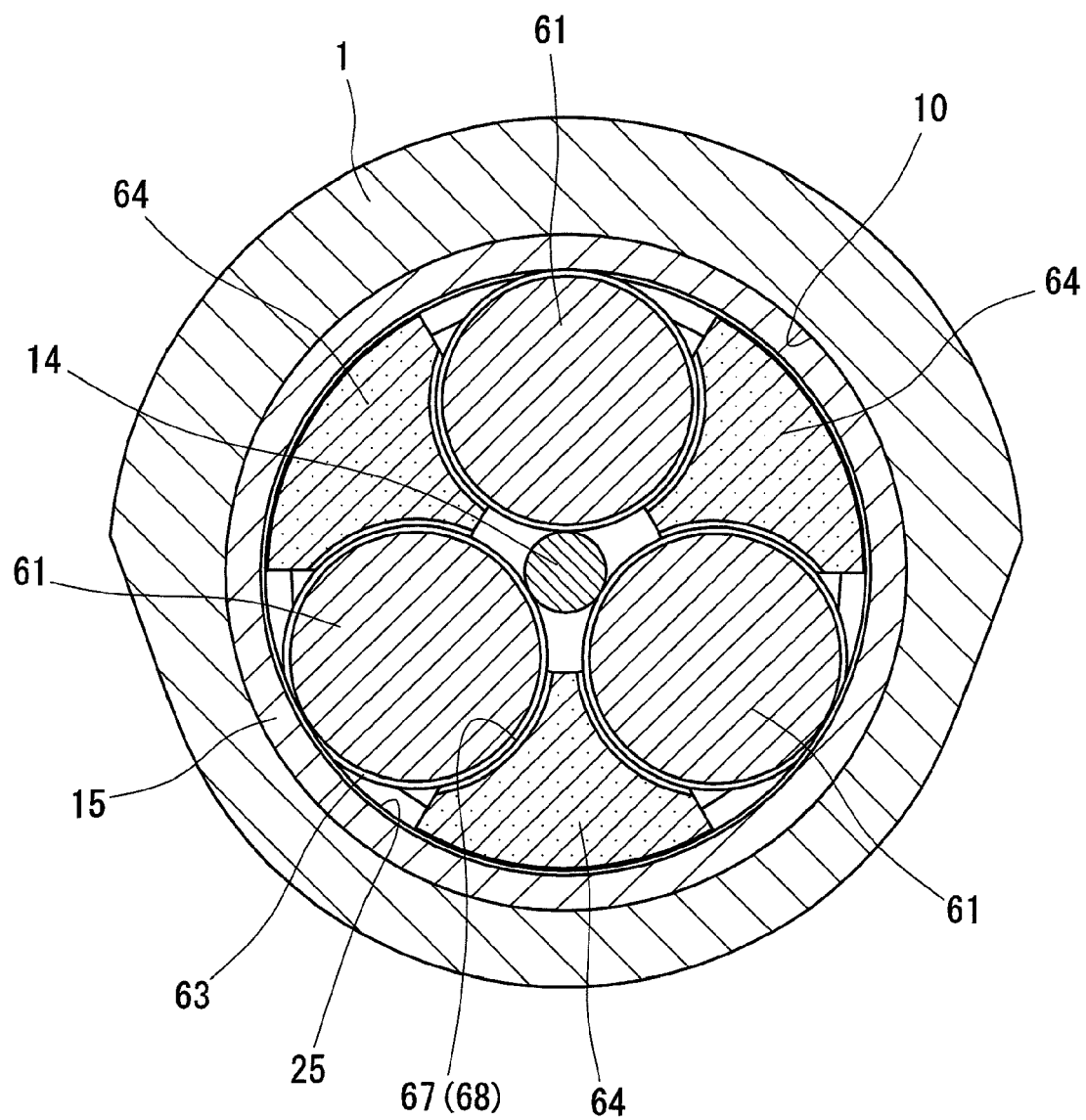
FIG. 17 is a sectional view taken along line XVII-XVII of FIG. 16.

FIGS. 16 and 17 show the electromechanical linear-motion actuator according to the second embodiment of the present invention. Elements corresponding to those of the first embodiment are denoted by identical numerals, and their description is omitted here.

A plurality of planetary rollers 61 are disposed between the radially outer surface of the rotary shaft 14 and the radially inner surface of the outer race member 15 so as to be circumferentially spaced from each other. The planetary rollers 61 have their radially outer surfaces in contact with the radially outer surface of the rotary shaft 14. Helical grooves 63 are formed in the radially outer surfaces of the respective planetary rollers 61, in which the helical rib 25 provided on the radially inner surface of the outer race member 15 engages.

The planetary rollers 61 axially face a planetary carrier 62 supported on the rotary shaft 14 through a slide bearing 31. Thrust ball bearings 27 are disposed between the respective planetary rollers 61 and the planetary carrier 62. Each thrust ball bearing 27 includes a raceway 28 formed on the axial end surface of the corresponding planetary roller 61 and a raceway 29 formed on the axial end surface of the planetary carrier 62.

The planetary carrier 62 integrally carries fan-shaped lubricant applying members 64 each in sliding contact with the radially outer surfaces of the corresponding circumferentially adjacent planetary rollers 61. A bottom plate 65 is axially fixed to the lubricant applying members 64 by a snap ring 66 so as to axially face the planetary carrier 62 with the planetary rollers 61 disposed between the bottom plate 65 and the planetary carrier 62. Thus, the planetary carrier 62 is axially movable together with the planetary rollers 61. As shown in FIG. 17, grooves 68 similar to the grooves 38 of the first embodiment are formed in contact surfaces 67 of each lubricant applying member 64 that are brought into contact with the respective planetary rollers 61.

In this electromechanical brake system, when the electric motor 19 is activated, the planetary rollers 61 move axially due to the engagement of the helical rib 25 in the helical grooves 63. The axial movement of the planetary rollers 61 is transmitted through the thrust ball bearings 27, planetary carrier 62, thrust ball bearing 34 and brake pad moving member 18 to the brake pad 3, thereby pressing the brake pad 3 against the brake disc 5. The revolving motion of the planetary rollers 61 about the rotary shaft 14 is transmitted through the lubricant applying members 64 to the planetary carrier 62. Thus, the planetary rollers 61 revolve about the rotary shaft 14 together with the planetary carrier 62.

As with the first embodiment, each thrust ball bearing 27 of the electromechanical linear-motion actuator 60 needs neither the bearing race on the planetary roller 61 nor the bearing race on the planetary carrier 62. Thus, the axial length of the actuator 60 is short, and thus the electromechanical brake system in which this electromechanical linear-motion actuator 60 is mounted is also short in axial length.

Also in this electromechanical linear-motion actuator 60, since the bottom plate 65, which axially faces the planetary carrier 62 with the planetary rollers 61 disposed therebetween, is axially fixed to the lubricant applying members 64, which are integral with the planetary carrier 62, the planetary carrier 62 is axially movable together with the planetary rollers 61. Thus, the support shafts 32 used in the first embodiment are not necessary in this embodiment, so that the manufacturing cost is lower.

Figure 18:
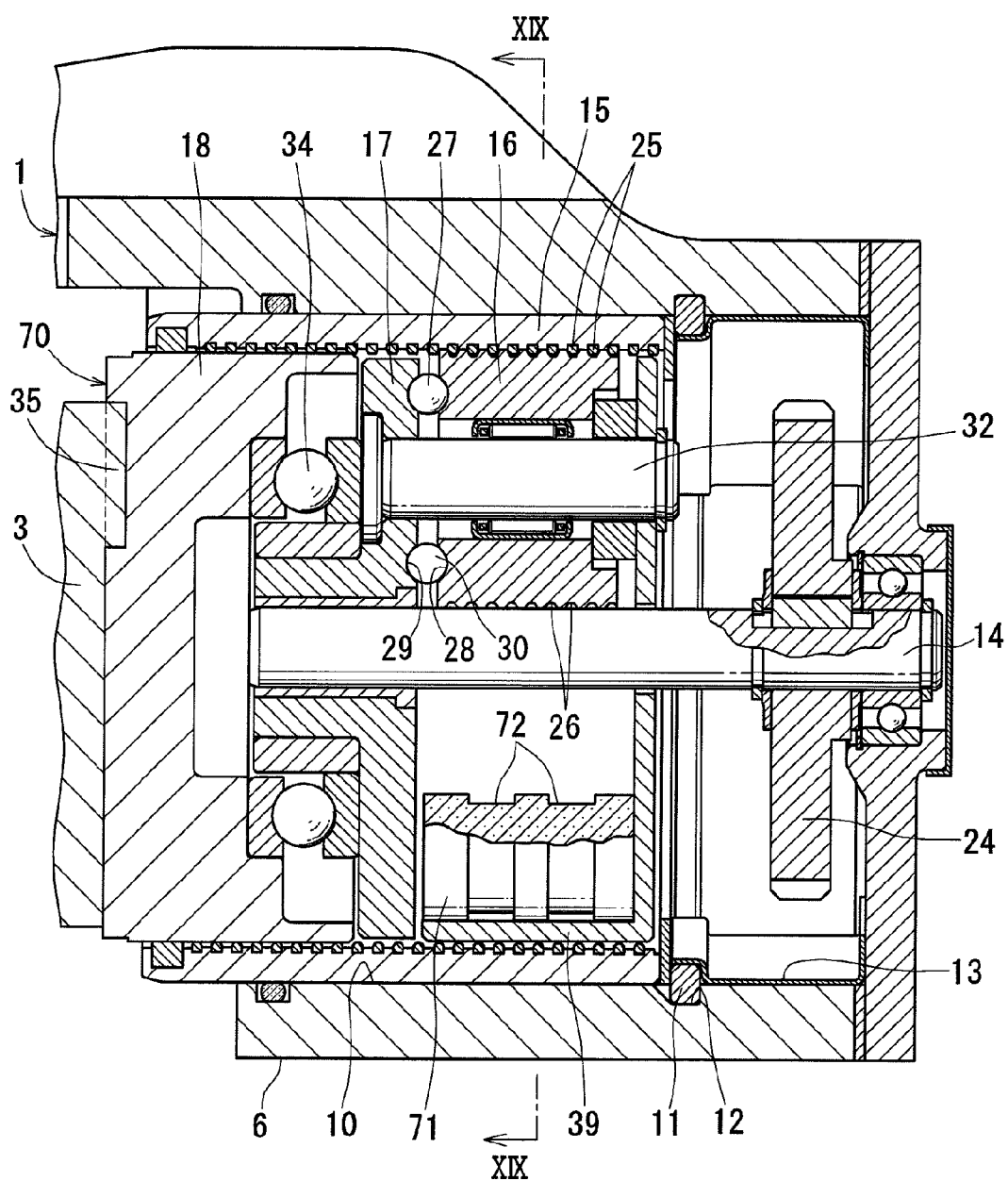
FIG. 18 is an enlarged sectional view of an electromechanical brake system in which is mounted an electromechanical linear-motion actuator of a third embodiment.
Figure 19:
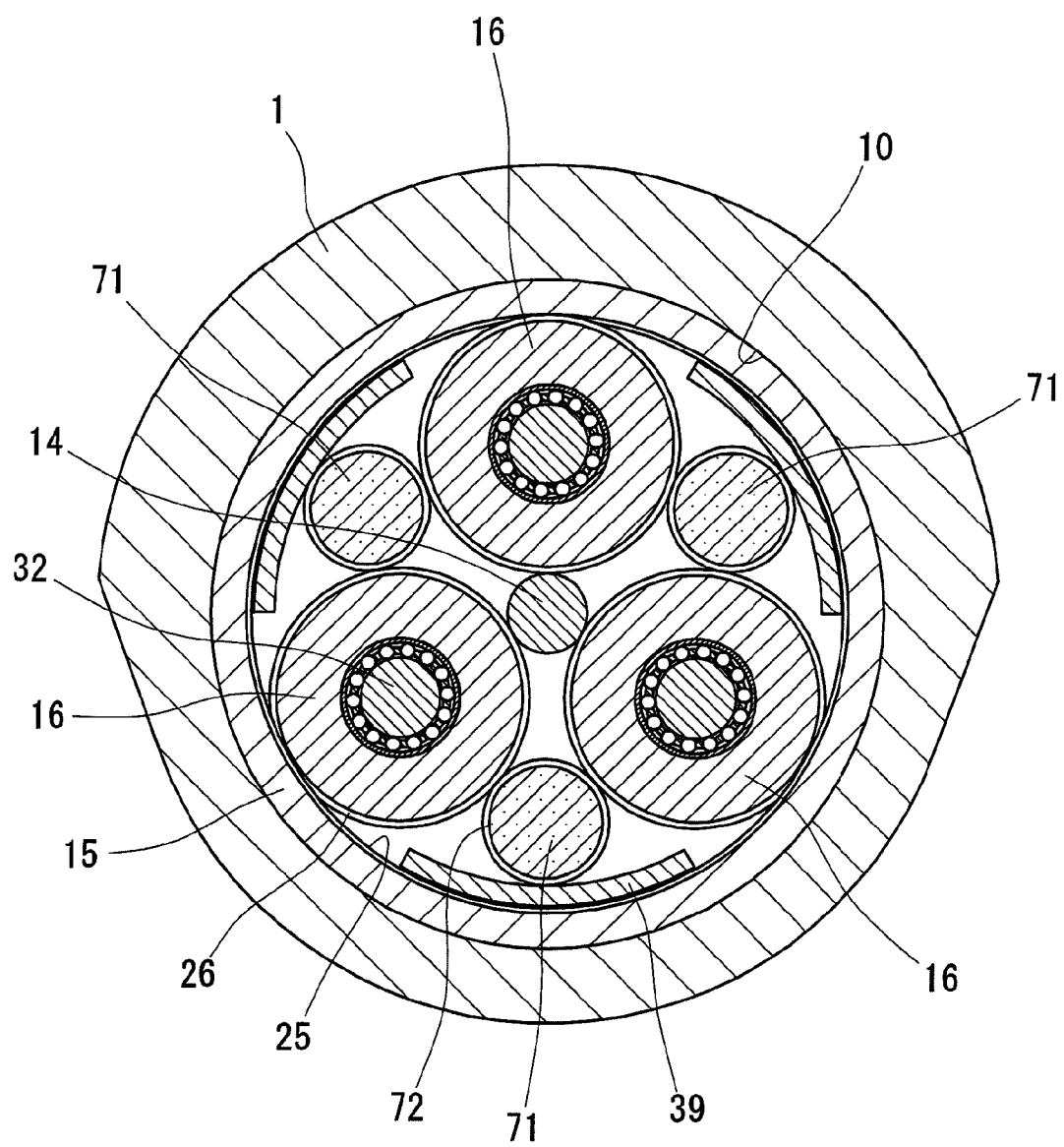
FIG. 19 is a sectional view taken along line XIX-XIX of FIG. 18.

FIGS. 18 and 19 show an electromechanical brake system in which is mounted an electromechanical linear-motion actuator 70 according to the third embodiment of the present invention. In this electromechanical linear-motion actuator 70, the fan-shaped lubricant applying members 36 of the first embodiment are replaced with lubricant applying members 71. Below, members corresponding to those of the first embodiment are denoted by identical numerals and their description is omitted.

The lubricant applying members 71 are rollers disposed between the adjacent planetary rollers 16 and kept in rolling contact with the radially outer surfaces of the respective planetary rollers 16 to apply lubricant sealed in the outer race member 15 to the radially outer surfaces of the respective planetary rollers 16. Grooves 72 are formed in the radially outer surface of each lubricant applying member 71 in which lubricant is retained. The lubricant applying members 71 are supported by the case 39.

In this electromechanical linear-motion actuator 70, because the lubricant applying members 71 roll on the radially outer surfaces of the respective planetary rollers 16, the lubricant applying members 71 are less likely to become worn than those in the electromechanical linear-motion actuator of the first embodiment, and thus less likely to produce wear dust. This makes lubricant less likely to deteriorate and improves durability.

Figure 20:
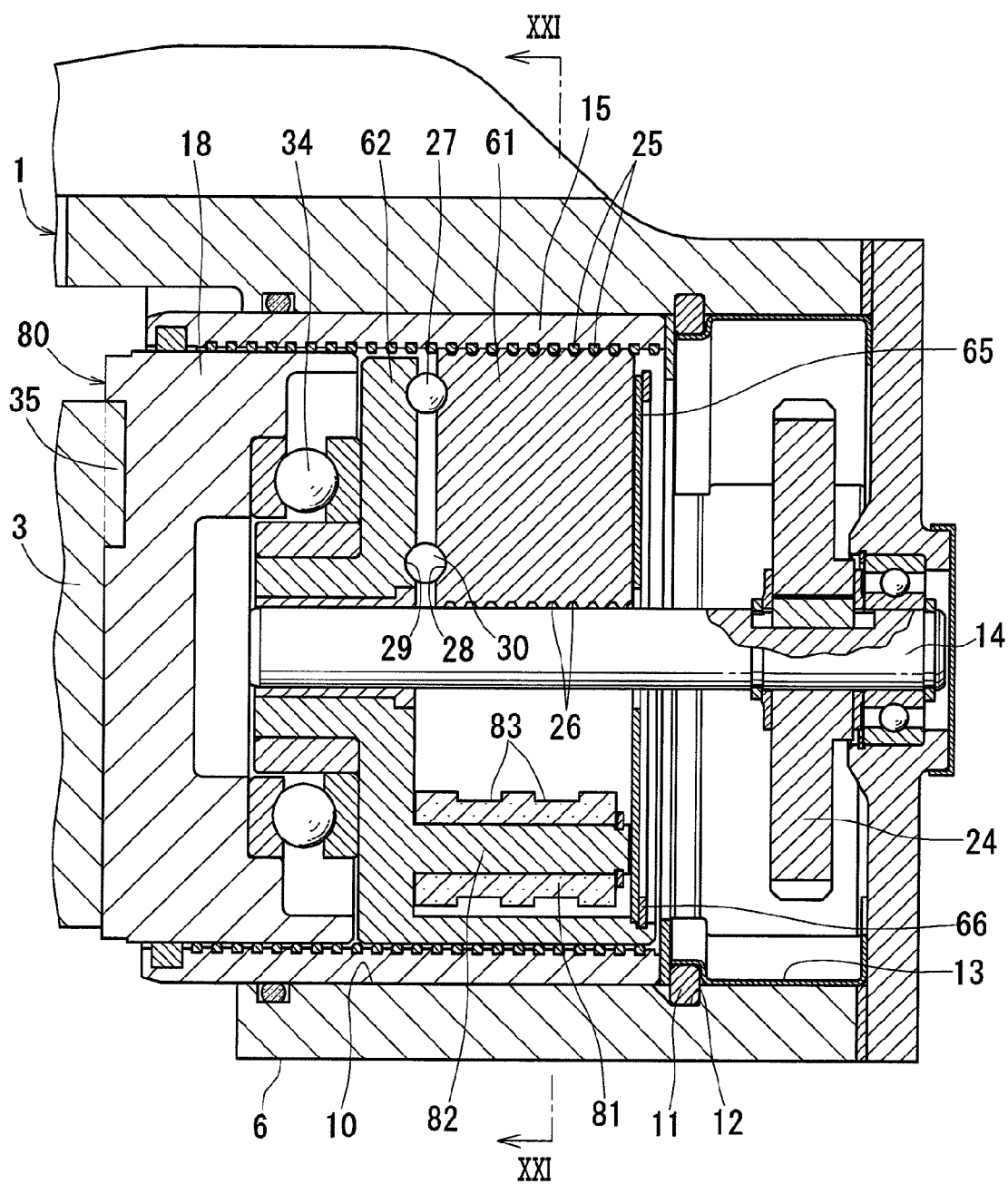
FIG. 20 is an enlarged sectional view of an electromechanical brake system in which is mounted an electromechanical linear-motion actuator of a fourth embodiment.
Figure 21:
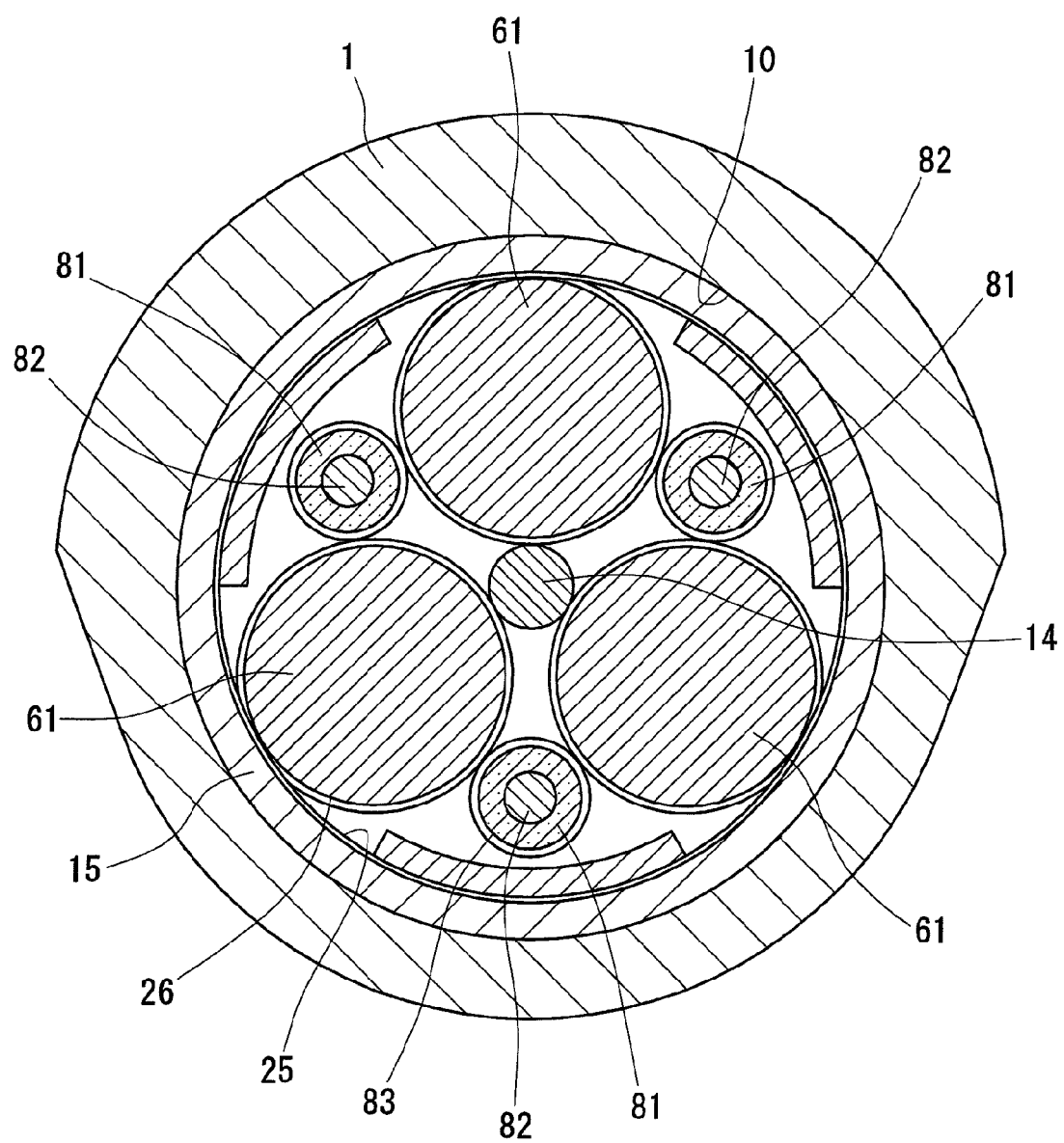
FIG. 21 is a sectional view taken along line XXI-XXI of FIG. 20.
Figure 22:
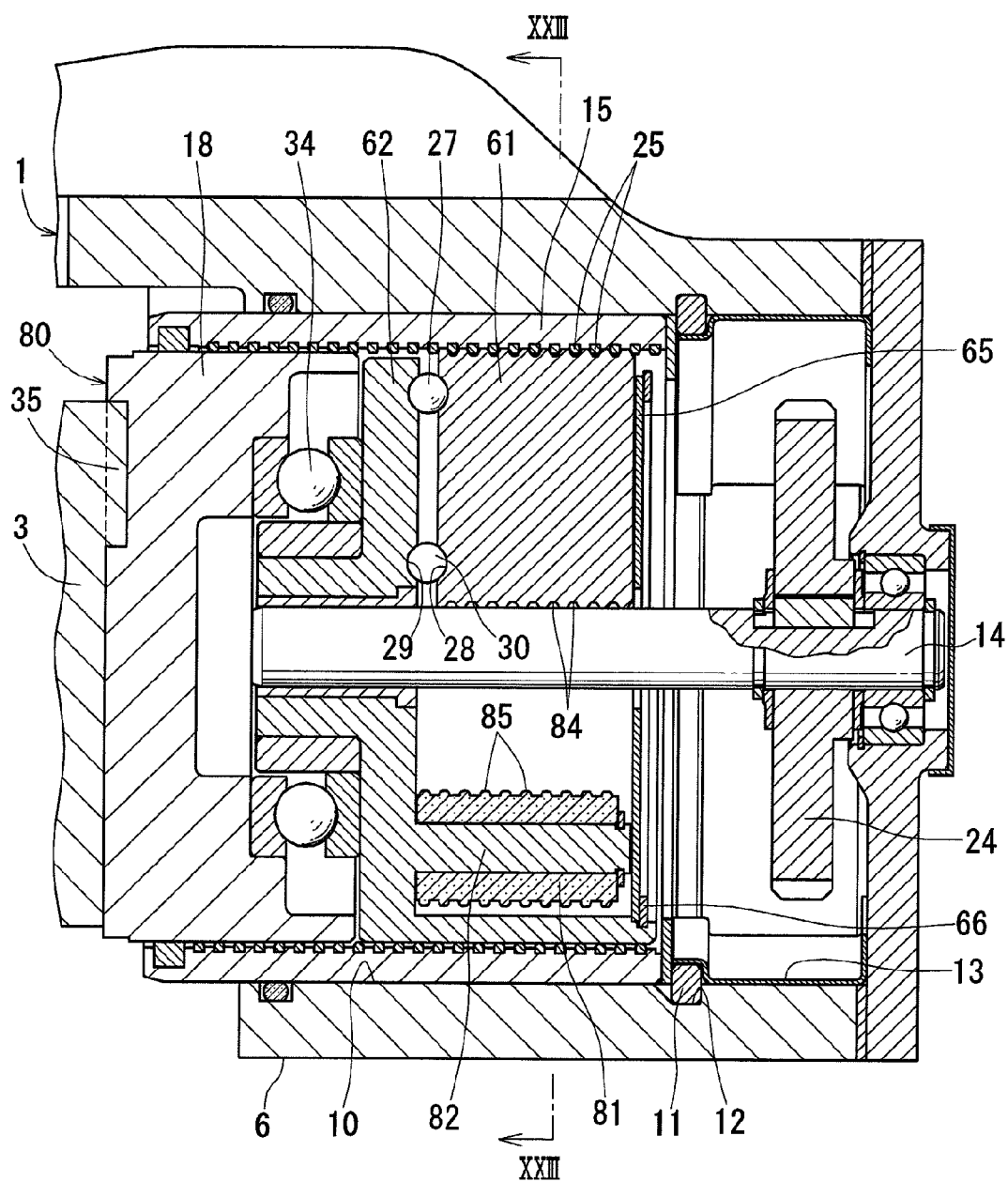
FIG. 22 is an enlarged sectional view of a modified example of the electromechanical linear-motion actuator of FIG. 20.
Figure 23:
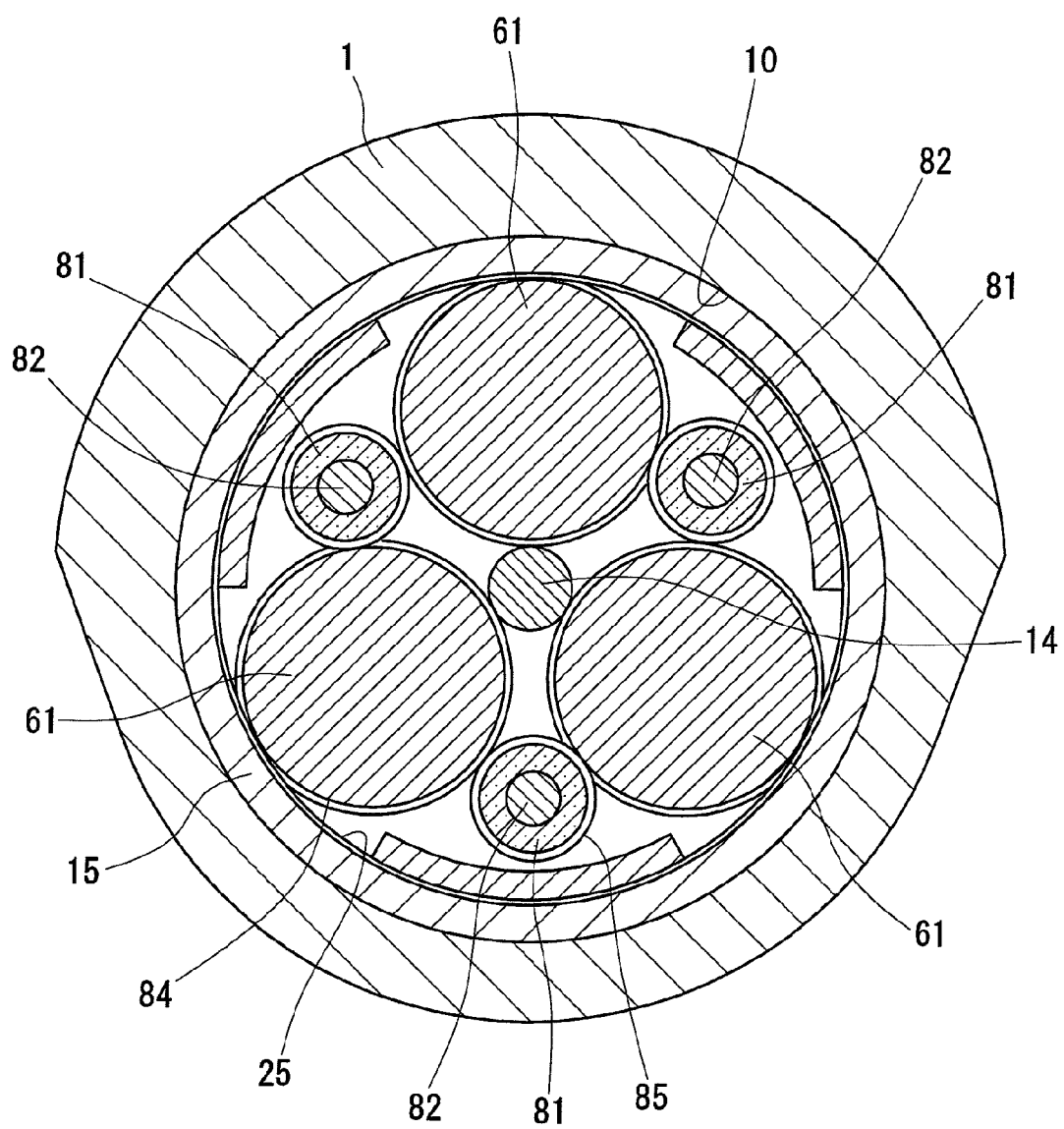
FIG. 23 is a sectional view taken along XXIII-XXIII of FIG. 22.

FIGS. 20 and 21 show an electromechanical brake system in which is mounted an electromechanical linear-motion actuator 80 according to the fourth embodiment of the present invention. In this electromechanical linear-motion actuator 80, the fan-shaped lubricant applying members 64 of the second embodiment are replaced with lubricant applying members 81. Below, members corresponding to those of the second embodiment are denoted by identical numerals and their description is omitted.

The lubricant applying members 81 are rollers disposed between the adjacent planetary rollers 61 and kept in rolling contact with the radially outer surfaces of the respective planetary rollers 61 to apply lubricant sealed in the outer race member 15 to the radially outer surfaces of the respective planetary rollers 61. Grooves 83 are formed in the radially outer surface of each lubricant applying member 81 in which lubricant is retained. The lubricant applying members 81 are rotatably supported on respective support shafts 82 integrally provided on the planetary carrier 62.

In this electromechanical linear-motion actuator 80, the revolving motion of the planetary rollers 61 around the rotary shaft 14 is transmitted through the lubricant applying members 81 and then support shafts 82 to the planetary carrier 62. As a result, the planetary rollers 61 revolve around the rotary shaft 14 together with the planetary carrier 62. Since the lubricant applying members 81 are in rolling contact with the planetary rollers 61, even if a large force acts between the planetary rollers 61 and the lubricant applying members 81, the lubricant applying members 81 are less likely to become worn.

Figure 24:
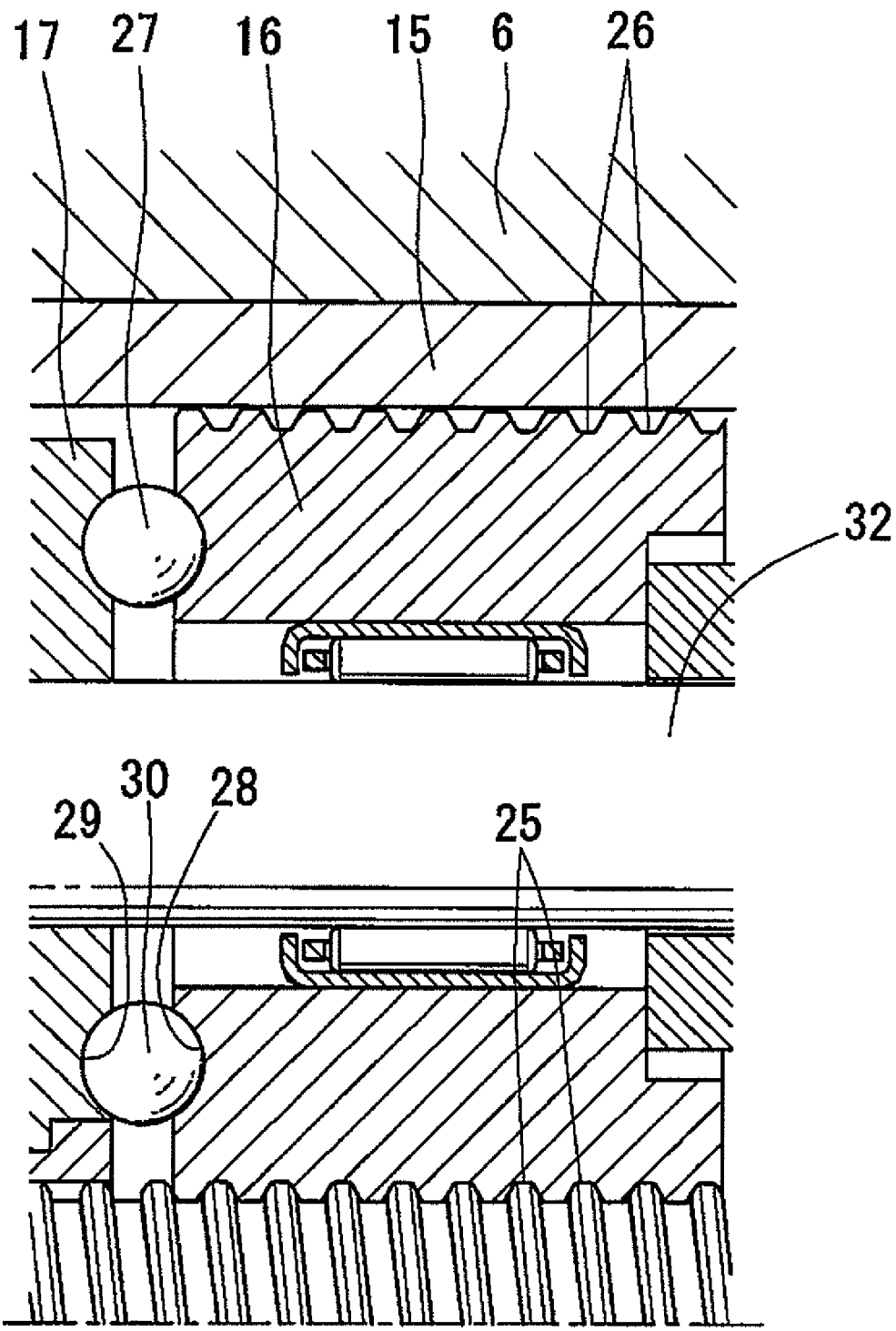
FIG. 24 is an enlarged sectional view of yet another modified example of the electromechanical linear-motion actuator shown in FIG. 2.

In the above embodiments, the helical rib 25, which engages the helical grooves 26 formed in the respective planetary rollers 16, are formed on the radially inner surface of the outer race member 15. But instead, as shown in FIG. 24, the helical groove may be formed on the radially outer surface of the rotary shaft 14.

In the above embodiments, the helical groove 26 is formed in the radially outer surface of each planetary roller 16. But instead of the helical groove 26, circumferential grooves may be formed in the radially outer surface of each planetary roller 16 so that the helical rib 25 on the outer race member 15 is engaged in the circumferential grooves. With this arrangement, too, when the planetary rollers 16 rotate, the planetary rollers 16 move axially with the circumferential grooves guided by the helical rib 25.

In the electromechanical linear-motion actuator 80 of the fourth embodiment, if circumferential grooves 84 are formed instead of the helical grooves 26, the circumferential ribs 85 may be formed on the radially outer surface of each lubricant applying member 81 that engage in the circumferential grooves 84 of the planetary rollers 61. With this arrangement, it is possible to directly apply lubricant to the inner surfaces of the circumferential grooves 84 formed in the radially outer surface of the planetary rollers 61.

What is claimed is:

1. An electromechanical linear-motion actuator comprising a rotary shaft (14) driven by an electric motor (19) and having a radially outer surface, a stationary outer race member (15) provided around the rotary shaft (14) and having a radially inner surface, a plurality of planetary rollers (16) disposed between the radially outer surface of the rotary shaft (14) and the radially inner surface of the outer race member (15) so as to be rotated about their own axes while revolving about the axis of the rotary shaft (14) when the rotary shaft (14) rotates, wherein a helical rib (25) is provided on the radially inner surface of the outer race member (15) or the radially outer surface of the rotary shaft (14), and wherein a helical groove (26) or circumferential grooves are formed in a radially outer surface of each of the planetary rollers (16) in which the helical rib (25) is engaged, a planetary carrier (17) axially facing the planetary rollers (16), and thrust rolling bearings (27) disposed between the planetary carrier (17) and the respective planetary rollers (16) for preventing the rotation of the respective planetary rollers (16) from being transmitted to the planetary carrier (17), wherein each of said thrust rolling bearings (27) comprises a raceway (28) formed on an axial end surface of the corresponding planetary roller (16).

2. The electromechanical linear-motion actuator of claim 1 wherein each of said thrust rolling bearings (27) comprises a raceway (29) formed on an axial end surface of the planetary carrier (17).

3. The electromechanical linear-motion actuator of claim 2 wherein said thrust rolling bearings are thrust ball bearings (27).

4. The electromechanical linear-motion actuator of claim 2 wherein said thrust rolling bearings are thrust roller bearings (46).

5. The electromechanical linear-motion actuator of claim 2 further comprising a moving member (18) axially facing the planetary carrier (17), and a thrust rolling bearing (34) disposed between the moving member (18) and the planetary carrier (17) for preventing transmission of revolving motion of the planetary carrier (17) to the moving member (18), and including a raceway (57) formed on the planetary carrier (17).

6. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 2.

7. The electromechanical linear-motion actuator of claim 1 wherein said thrust rolling bearings are thrust ball bearings (27).

8. The electromechanical linear-motion actuator of claim 7 wherein said thrust rolling bearings (27, 46) include rolling elements (30, 45) made of a ceramic material.

9. The electromechanical linear-motion actuator of claim 8 further comprising a moving member (18) axially facing the planetary carrier (17), and a thrust rolling bearing (34) disposed between the moving member (18) and the planetary carrier (17) for preventing transmission of revolving motion of the planetary carrier (17) to the moving member (18), and including a raceway (57) formed on the planetary carrier (17).

10. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 8.

11. The electromechanical linear-motion actuator of claim 7 further comprising a moving member (18) axially facing the planetary carrier (17), and a thrust rolling bearing (34) disposed between the moving member (18) and the planetary carrier (17) for preventing transmission of revolving motion of the planetary carrier (17) to the moving member (18), and including a raceway (57) formed on the planetary carrier (17).

12. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 7.

13. The electromechanical linear-motion actuator of claim 1 wherein said thrust rolling bearings are thrust roller bearings (46).

14. The electromechanical linear-motion actuator of claim 13 wherein said thrust rolling bearings (27, 46) include rolling elements (30, 45) made of a ceramic material.

15. The electromechanical linear-motion actuator of claim 13 further comprising a moving member (18) axially facing the planetary carrier (17), and a thrust rolling bearing (34) disposed between the moving member (18) and the planetary carrier (17) for preventing transmission of revolving motion of the planetary carrier (17) to the moving member (18), and including a raceway (57) formed on the planetary carrier (17).

16. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 13.

17. The electromechanical linear-motion actuator of claim 1 further comprising a moving member (18) axially facing the planetary carrier (17), and a thrust rolling bearing (34) disposed between the moving member (18) and the planetary carrier (17) for preventing transmission of revolving motion of the planetary carrier (17) to the moving member (18), and including a raceway (57) formed on the planetary carrier (17).

18. The electromechanical linear-motion actuator of claim 17 wherein said thrust rolling bearing (34) for preventing transmission of revolving motion of the planetary carrier (17) to the moving member (18) includes a raceway (58) formed on the moving member (18).

19. The electromechanical linear-motion actuator of claim 18 wherein said thrust rolling bearing (34) for preventing transmission of revolving motion of the planetary carrier (17) to the moving member (18) includes rolling elements made of a ceramic material.

20. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 18.

21. The electromechanical linear-motion actuator of claim 17 wherein said thrust rolling bearing (34) for preventing transmission of revolving motion of the planetary carrier (17) to the moving member (18) includes rolling elements made of a ceramic material.

22. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 21.

23. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 17.

24. An electromechanical brake system comprising a brake pad (3), a brake disc (5) and an electromechanical linear-motion actuator (2) for driving and pressing the brake pad (3) against the brake disc (5), wherein the electromechanical linear-motion actuator (2) is the electromechanical linear-motion actuator of claim 1.

25. The electromechanical brake system of claim 24 wherein each of said thrust rolling bearings comprises rolling elements that are in direct rolling contact with, and are guided along, the raceway formed on the axial end surface of the corresponding planetary roller.

26. The electromechanical linear-motion actuator of claim 1 wherein each of said thrust rolling bearings comprises rolling elements that are in direct rolling contact with, and are guided along, the raceway formed on the axial end surface of the corresponding planetary roller.

* * * * *